(12) United States Patent
Miyajima

(10) Patent No.: US 11,392,979 B2
(45) Date of Patent: Jul. 19, 2022

(54) INFORMATION PROCESSING SYSTEM, COMMUNICATION DEVICE, CONTROL METHOD, AND STORAGE MEDIUM

(71) Applicant: SONY CORPORATION, Tokyo (JP)

(72) Inventor: Yasushi Miyajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 324 days.

(21) Appl. No.: 15/566,003

(22) PCT Filed: Jan. 21, 2016

(86) PCT No.: PCT/JP2016/051726
§ 371 (c)(1),
(2) Date: Oct. 12, 2017

(87) PCT Pub. No.: WO2016/178327
PCT Pub. Date: Nov. 10, 2016

(65) Prior Publication Data
US 2018/0121946 A1    May 3, 2018

(30) Foreign Application Priority Data

May 1, 2015 (JP) .............................. JP2015-094067

(51) Int. Cl.
*G06Q 30/00* (2012.01)
*G06Q 30/02* (2012.01)
(Continued)

(52) U.S. Cl.
CPC ......... *G06Q 30/0236* (2013.01); *G06Q 40/08* (2013.01); *G06Q 50/10* (2013.01);
(Continued)

(58) Field of Classification Search
CPC .............. G06Q 30/0236; G06Q 40/08; G06K 9/00255; G06K 9/00302
See application file for complete search history.

(56) References Cited

U.S. PATENT DOCUMENTS

2008/0060033 A1\* 3/2008 Xiao .................. G06K 9/00335
725/105
2010/0235451 A1 9/2010 Yu et al.
(Continued)

FOREIGN PATENT DOCUMENTS

AU 2011329025 A1 5/2013
CN 103209642 A 7/2013
(Continued)

OTHER PUBLICATIONS

International Search Report and Written Opinion of PCT Application No. PCT/JP2016/051726, dated Mar. 22, 2016, 10 pages of ISRWO.
(Continued)

*Primary Examiner* — Meredith A Long
(74) *Attorney, Agent, or Firm* — Chip Law Group

(57) ABSTRACT

An information processing system including a communication unit configured to receive information related to a positive interaction presented to a second object by a first object and information related to a positive interaction presented to the first object by the second object, and a controller configured to generate an emotion value of the first object based on at least a part of the received information related to the positive interactions.

10 Claims, 21 Drawing Sheets

(51) Int. Cl.
  *G06Q 40/08* (2012.01)
  *G06Q 50/10* (2012.01)
  *G09B 19/00* (2006.01)
  *G06V 40/16* (2022.01)

(52) U.S. Cl.
  CPC .......... *G06V 40/166* (2022.01); *G06V 40/174* (2022.01); *G09B 19/00* (2013.01)

(56) References Cited

U.S. PATENT DOCUMENTS

| | | | |
|---|---|---|---|
| 2012/0124122 A1 | 5/2012 | Elkaliouby et al. | |
| 2014/0012091 A1* | 1/2014 | Reynolds | G06F 19/328 600/300 |
| 2014/0140497 A1* | 5/2014 | Ripa | H04M 3/5133 379/265.06 |
| 2014/0149546 A1* | 5/2014 | Hong | H04L 67/125 709/217 |
| 2014/0212853 A1* | 7/2014 | Divakaran | G09B 19/00 434/236 |
| 2014/0249891 A1* | 9/2014 | Olguin Olguin | G06Q 10/0639 705/7.38 |
| 2015/0193507 A1* | 7/2015 | Rappoport | G06Q 10/101 382/118 |
| 2015/0206011 A1* | 7/2015 | Jerauld | G06T 11/60 345/8 |
| 2016/0117592 A1* | 4/2016 | Jung | G06Q 30/02 706/12 |
| 2016/0180225 A1* | 6/2016 | Dakshinamurthy | G06K 9/00302 706/11 |

FOREIGN PATENT DOCUMENTS

| | | |
|---|---|---|
| EP | 2641228 A2 | 9/2013 |
| JP | 2010-186373 A | 8/2010 |
| JP | 2011-082913 A | 4/2011 |
| JP | 2011-223369 A | 11/2011 |
| JP | 2012-155374 A | 8/2012 |
| JP | 2012-185736 A | 9/2012 |
| JP | 2014-501967 A | 1/2014 |
| JP | 2015-050470 A | 3/2015 |
| KR | 10-2014-0001930 A | 1/2014 |
| TW | 201033819 A | 9/2010 |
| WO | 2012/068193 A2 | 5/2012 |

OTHER PUBLICATIONS

Office Action for JP Patent Application No. 2017-516560, dated Feb. 12, 2020, 06 pages of Office Action and 04 pages of English Translation.

Office Action for JP Patent Application No. 2020-098003, dated Aug. 17, 2021, 03 pages of English Translation and 03 pages of Office Action.

* cited by examiner

FIG. 6

| OBJECT ID | DATE/TIME AND PERIOD | RELATED OBJECT ID | TYPE OF INTERACTION | DETAILS | EVALUATION (-1.0~1.0) |
|---|---|---|---|---|---|
| 1930213 (PERSON) | 2014/06/21 15:34 | 18000555 (PERSON) | EXPRESSION | CONTENT: SMILE DEGREE OF SMILING: 0.7 | 0.70 |
| ... | ... | ... | ... | ... | ... |
| 1930213 | 2014/07/11 10:41 | 384 (PERSON) | WORDS | CONTENT: THANK YOU | 0.92 |
| 1930213 | 2014/07/23 12:12 | 4649 (PERSON) | EXPRESSION | CONTENT: SMILE DEGREE OF SMILING: 0.85 | 0.85 |
| 384 | 2014/07/23 12:14 | 5963084 (STUFFED TOY) | EXPRESSION | CONTENT: SMILE DEGREE OF SMILING: 0.95 | 0.95 |
| 384 | 2014/07/23 12:14 | 5963084 (STUFFED TOY) | OPERATION | CONTENT: EMBRACING CLOSE | 0.88 |
| ... | ... | ... | ... | ... | ... |

INFORMATION PROCESSING SYSTEM, COMMUNICATION DEVICE, CONTROL METHOD, AND STORAGE MEDIUM

CROSS REFERENCE TO RELATED APPLICATIONS

This application is a U.S. National Phase of International Patent Application No. PCT/JP2016/051726 filed on Jan. 21, 2016, which claims priority benefit of Japanese Patent Application No. JP 2015-094067 filed in the Japan Patent Office on May 1, 2015. Each of the above-referenced applications is hereby incorporated herein by reference in its entirety.

TECHNICAL FIELD

The present disclosure relates to an information processing system, a communication device, a control method, and a storage medium.

BACKGROUND ART

In recent years, information processing systems detecting smiles of people and performing predetermined processes in accordance with detection of the smiles have been proposed.

For example, the following Patent Literature 1 discloses a smile banking system in which smiles of customers are captured in ATMs installed at bank branches and privilege services such as preferential interest rates of card loans can be obtained from banks as the smiles are saved.

In addition, the following Patent Literature 2 discloses a system in which average values of degrees of smiling are calculated from face images and advice for smile training is output in accordance with the average values.

CITATION LIST

Patent Literature

Patent Literature 1: JP 2012-185736A
Patent Literature 2: JP 2010-186373A

DISCLOSURE OF INVENTION

Technical Problem

However, the systems of the related art in which the above-described smiles are used are closed systems between devices and users in which behavior such as smiling performed between the devices and users are detected and privilege or advice is provided to the users and are used only in environments of the users.

Systems that prompt smiles in daily life in the stressful present day on the basis of the idea that people become happy because of smiling rather than that people smile because they are happy are valuable in that they make people happy. In addition, it has recently been reported that when people smile, their immunity is strengthened and good influences are exerted on their bodies.

Accordingly, results stored by specifying positive interactions such as smiling or saying words of gratitude such as "thank you" between people or between people and things in daily life can be shared with not only users but also people other than users or services, so that people can have more smiles and more words of gratitude in their lives, people become happy, and finally mental and physical health can also be improved.

Accordingly, the present disclosure proposes an information processing system, a communication device, a control method, and a storage medium capable of generating positive interactions between people or between people and things as emotion values.

Solution to Problem

According to the present disclosure, there is provided an information processing system including: a communication unit configured to receive information related to a positive interaction presented to a second object by a first object and information related to a positive interaction presented to the first object by the second object; and a controller configured to generate an emotion value of the first object on a basis of at least a part of the received information related to the positive interactions.

According to the present disclosure, there is provided a communication device including: an imaging unit configured to image an expression of a second object facing a first object wearing the communication device; a directional sound collection unit configured to collect a sound of the second object; a communication unit configured to transmit identification information of the first object and receive identification information of the second object; and a controller configured to associate an image captured by the imaging unit or a sound collected by the directional sound collection unit with the identification information of the first object and the identification information of the second object, and perform transmission, via the communication unit, to a server including a storage unit that stores information related to an interaction of an object in association with identification information of the object.

According to the present disclosure, there is provided a communication device including: an imaging unit configured to image an expression of a first object wearing the communication device and an expression of a second object facing the first object; a sound collection unit configured to collect a sound of the first object and a sound of the second object; and a controller configured to associate an image and a sound of a first object and an image and a sound of a second object acquired by the imaging unit and the sound collection unit with identification information of the first object, and perform transmission, via a communication unit, to a server including a storage unit that stores information related to an interaction of an object in association with identification information of the object.

According to the present disclosure, there is provided a control method including: receiving information related to a positive interaction presented to a second object by a first object and information related to a positive interaction presented to the first object by the second object; and generating, by a controller, an emotion value of the first object on a basis of at least a part of the received information related to the positive interactions.

According to the present disclosure, there is provided a storage medium storing a program that causes a computer to function as: an imaging unit configured to image an expression of a second object facing a first object wearing a communication device; a directional sound collection unit configured to collect a sound of the second object; a communication unit configured to transmit identification information of the first object and receive identification information of the second object; and a controller configured to associate an image captured by the imaging unit or a sound collected by the directional sound collection unit with the identification information of the first object and the identification information of the second object, and perform transmission, via the communication unit, to a server including a storage unit that stores information related to an interaction of an object in association with identification information of the object.

According to the present disclosure, there is provided a storage medium storing a program that causes a computer to function as: an imaging unit configured to image an expression of a first object wearing a communication device and an expression of a second object facing the first object; a sound collection unit configured to collect a sound of the first object and a sound of the second object; and a controller configured to associate an image and a sound of a first object and an image and a sound of a second object acquired by the imaging unit and the sound collection unit with identification information of the first object, and perform transmission, via a communication unit, to a server including a storage unit that stores information related to an interaction of an object in association with identification information of the object.

Advantageous Effects of Invention

According to the present disclosure, as described above, it is possible to generate positive interactions between people or between people and things as emotion values.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating an example of interaction information stored in an emotion information DB according to the embodiment.

MODE(S) FOR CARRYING OUT THE INVENTION

Figure 1:
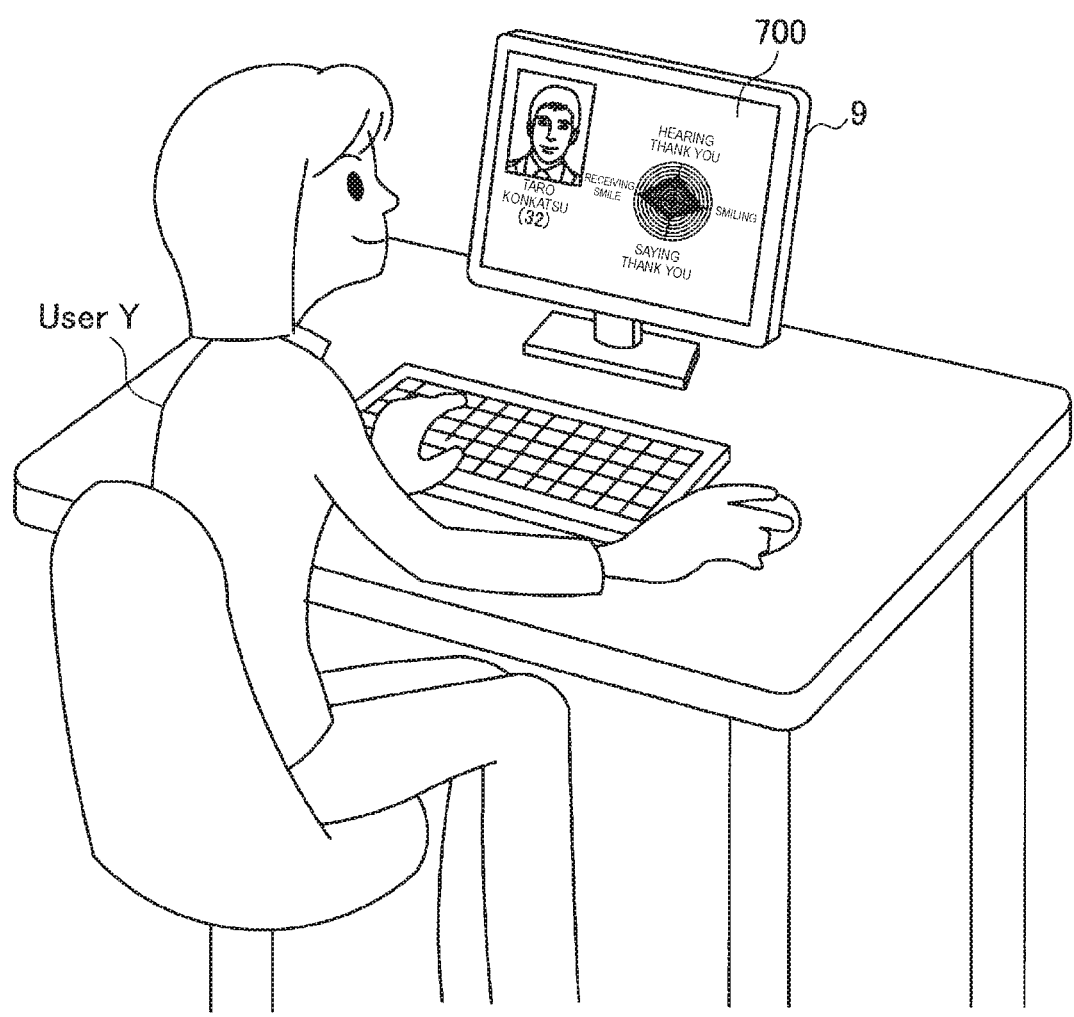
FIG. 1 is an explanatory diagram illustrating use of emotion values calculated by specifying positive interactions in a spouse searching service according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.
1. Overview of information processing system according to embodiment of the present disclosure
2. Basic configuration
2-1. Sensing device
2-2. Emotion server
2-3. Bias calculation server
3. Embodiments
3-1. First embodiment
3-2. Second embodiment
3-3. Third embodiment
4. Conclusion <<Overview of Information Processing System According to Embodiment of the Present Disclosure>>

First, an overview of an information processing system according to an embodiment of the present disclosure will be described. The information processing system according to the embodiment specifies positive interactions among interactions between a user and people or things and generates emotion values (also referred to as positive emotion values) of the user on the basis of the fact that the user performs or receives the positive interactions. The emotion value is an index indicated by digitizing a value of a feeling (that is, a sentiment) held by (or holding) a person (or a thing). For example, an emotion value of a person who performs more positive interactions or a person who receives more positive interactions is increased.

The emotion values of the user calculated by specifying positive interactions in this way can be shared not only with the user but also people other than the user or services, so that people can have more smiles or more words of gratitude in their lives, people become happy, and finally mental and physical health can also be improved.

For example, FIG. 1 is an explanatory diagram illustrating use of emotion values calculated by specifying positive interactions in a spouse searching service according to an embodiment of the present disclosure. The spouse searching service is a service that supports various activities for the purpose of finding marriage and provides, for example, a system that matches people who are registered as prospective marriage partners. In the example illustrated in FIG. 1, a female user Y performing marriage activities accesses a spouse searching service using an information processing device 9 and searches for a partner in whom the female user Y is interested with reference to profile information of a marriage partner (a face image, a name, an age, a birthplace, a residence, a family structure, a divorce history, an occupation, an annual income, and the like).

At this time, as shown on a display screen 700 in FIG. 1, emotion values calculated by specifying positive interactions of a target person ("Taro Konkatsu" (a user X) illustrated in FIG. 1) up to the present are displayed on, for example, a radar chart, and thus the user Y can know what the target person is like, thereby improving convenience of the spouse searching service. In addition, since emotion values based on positive interactions among everyday behavior of the user X are presented to the partner as an example of spouse searching profile information, the user X consciously changes everyday behavior and makes an effort to give a favorable impression. This can ultimately improve the happiness of society overall.

The overview and the use example of the information processing system according to the embodiment of the present disclosure have been described above. Next, an overall configuration of the information processing system according to the embodiment will be described with reference to FIG. 2.

Figure 2:
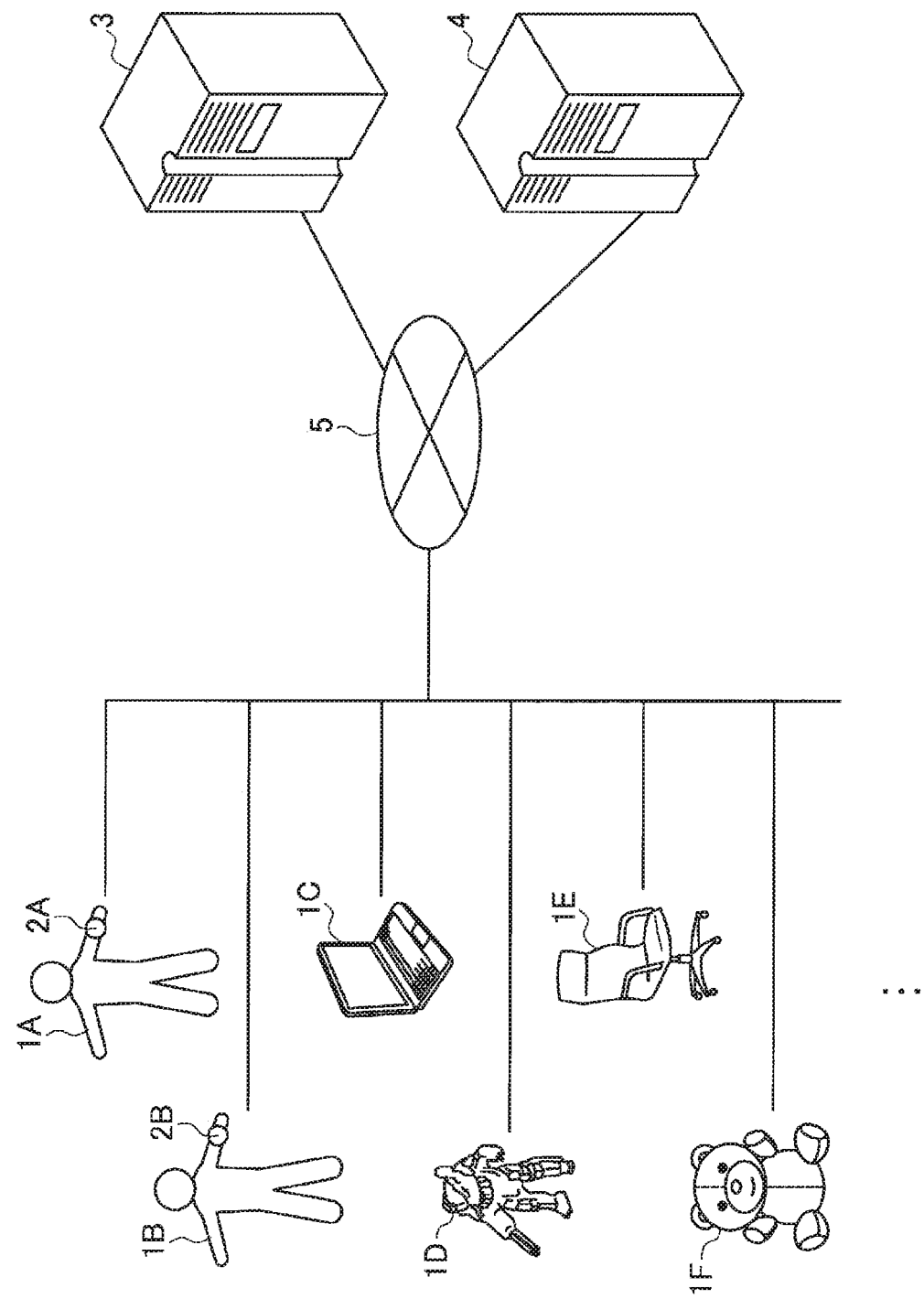
FIG. 2 is a diagram illustrating an example of an overall configuration of an information processing system according to the embodiment.

FIG. 2 is a diagram illustrating an example of an overall configuration of an information processing system according to the embodiment. As illustrated in FIG. 2, the information processing system according to the embodiment includes an emotion server 3 that acquires interactions between a plurality of objects from objects 1A to 1F and accumulates the interactions and a bias calculation server 4 that calculates bias values of emotion values based on positive interactions. The emotion server 3 and the bias calculation server 4 are connected for communication via, for example, a network 5.

Interactions between the plurality of objects are detected by, for example, sensors such as cameras or microphones which are mounted on the objects 1C to 1F that are things and also function as sensing devices 2. The detected interactions are transmitted to the emotion server 3 via the network 5. In addition, interactions of objects 1A and 1B that are persons are detected by sensing devices 2A and 2B worn by the persons and are transmitted to the emotion server 3 via the network 5.

In addition, interactions between the plurality of objects are detected by each of both sides performing the interactions and sides on which the interactions are performed (received) and are transmitted to the emotion server 3 along with object IDs.

In the embodiment, in particular, smiles or words of gratitude such as "thank you" are treated as positive interactions. Therefore, sensors such as cameras or microphones are mainly used to detect interactions. Also, when a person is wearing the sensing device 2, a smile of the person (for example, the object 1A) may not be imaged in some cases depending on the structure of the sensing device 2. However, a camera mounted on or worn by an object (for example, the object 1B) of a partner can image the smile of the object 1A. Then, the sensing device 2B of the object 1B transmits a smile interaction of the object 1A and the object ID of the object 1A to the emotion server 3. Thus, even in a case in which the smile interaction of the person may not be imaged with the sensing device 2 of the person, the smile interaction can be imaged and detected by the sensing device 2 of the partner.

The emotion server 3 accumulates the interactions between the plurality of objects or evaluation values of the interactions and calculates emotion values based on the accumulated positive interactions in response to a request from the bias calculation server 4 to transmit the emotion values to the bias calculation server 4.

The bias calculation server 4 calculates a bias value of the positive emotion value (also referred to as a positive bias value) serving as a base on the basis of the positive interactions in which a specific person smiles or says words of gratitude for a previous given period. For example, the calculated bias value may be an average value of evaluation values of the positive interactions for a given period or may be an average value of n latest points.

The bias calculation server 4 notifies a cloud server or an application providing a predetermined service of the bias value related to the positive interactions of the specific person. In addition, at this time, the bias calculation server 4 may acquire emotion values (evaluation values) of positive interactions of a specific person occurring in real time (currently) and notify the cloud server or the application of the emotion values of the current positive interactions along with the bias value of the positive interactions.

The cloud server or the application receiving the bias value or the like of the positive interactions of the specific person allows a person other than the specific person to browse information regarding the positive interactions of the specific person or performs expression change control of a stuffed toy in accordance with the bias value. In this way, in the information processing system according to the embodiment, the positive interactions of the specific person are presented to another person in various forms. Therefore, each person is led to consciously increase his or her smiling or words of gratitude. As a result, the happiness of society overall can be achieved.

Also, in the configuration of the system illustrated in FIG. 2, the emotion server 3 and the bias calculation server 4 are illustrated as separate servers, but the embodiment is not limited thereto. The emotion server 3 and the bias calculation server 4 may be an integrated server. In addition, the bias calculation server 4 may be integrated with the cloud server or the application that allows another person to browse the information regarding the positive interactions or changes an expression of a stuffed toy.

The example of the overall configuration of the information processing system according to the embodiment has been described above. Next, basic configurations of the sensing device 2, the emotion server 3, and the bias calculation server 4 included in the information processing system according to the embodiment will be described specifically with reference to FIGS. 3 to 7.

<<2. Basic Configuration>>

<2-1. Sensing Device>

Figure 3:
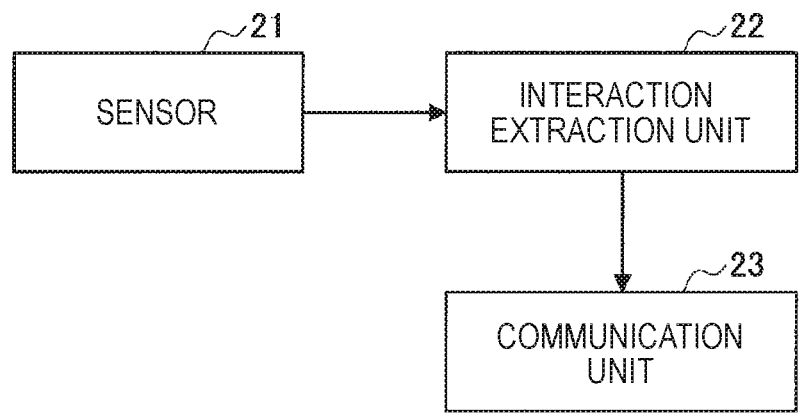
FIG. 3 is a diagram illustrating an example of the configuration of a sensing device according to the embodiment.

FIG. 3 is a diagram illustrating an example of the configuration of a sensing device 2 according to the embodiment. As illustrated in FIG. 3, the sensing device 2 includes a sensor 21, an interaction extraction unit 22, and a communication unit 23.

(Sensor)

The sensor 21 has a function of detecting an interaction between objects. The sensor 21 is realized by, for example, a camera, an infrared sensor, a microphone, a humidity sensor, a temperature sensor, a vibration sensor, a tactile sensor, a gyro sensor, an acceleration sensor, an illuminance sensor, a human detection sensor, an atmospheric sensor (specifically, a dust sensor or a contaminant sensor), a speed sensor, a number-of-times measurement value, or the like.

(Interaction Extraction Unit)

The interaction extraction unit 22 functions as a detection unit that analyzes sensing data output from the sensor 21 and detects information related to an interaction between first and second objects. For example, the interaction extraction unit 22 specifically extracts an interaction (smiles, conversation, donation, or the like) between people or an interaction between a person and an article (facial expressions toward an article, maintenance of an article, handling of an article, or the like). In addition, the interaction extraction unit 22 also functions as a controller that performs control such that the extracted interaction information is transmitted from the communication unit 23 to the emotion server 3 in association with the ID of the first object and the ID of the second object.

(Communication Unit)

The communication unit 23 transmits information related to the interaction extracted by the interaction extraction unit 22 to the emotion server 3 via the network 5.

In the above-described sensing device 2, a microcomputer that includes a central processing unit (CPU), a read-only memory (ROM), a random access memory (RAM), and a nonvolatile memory is loaded to control each configuration of the sensing device 2.

In addition, the sensing device 2 may be contained in an object that is a thing or may be carried by an object that is a thing or a person. A type of sensing device 2 carried by an object that is a thing or a person may be, for example, a wearable device of a neck-hanging type, head-mounted type, glasses type, ring type, armband type, or watch type, or the like, or may be a mobile terminal such as a smartphone, a tablet terminal, or a notebook type PC. In addition, the sensing device 2 may be a badge type device or may be worn on a collar or a breast of a suit. Hereinafter, specific description will be made with reference to FIG. 4.

Figure 4:
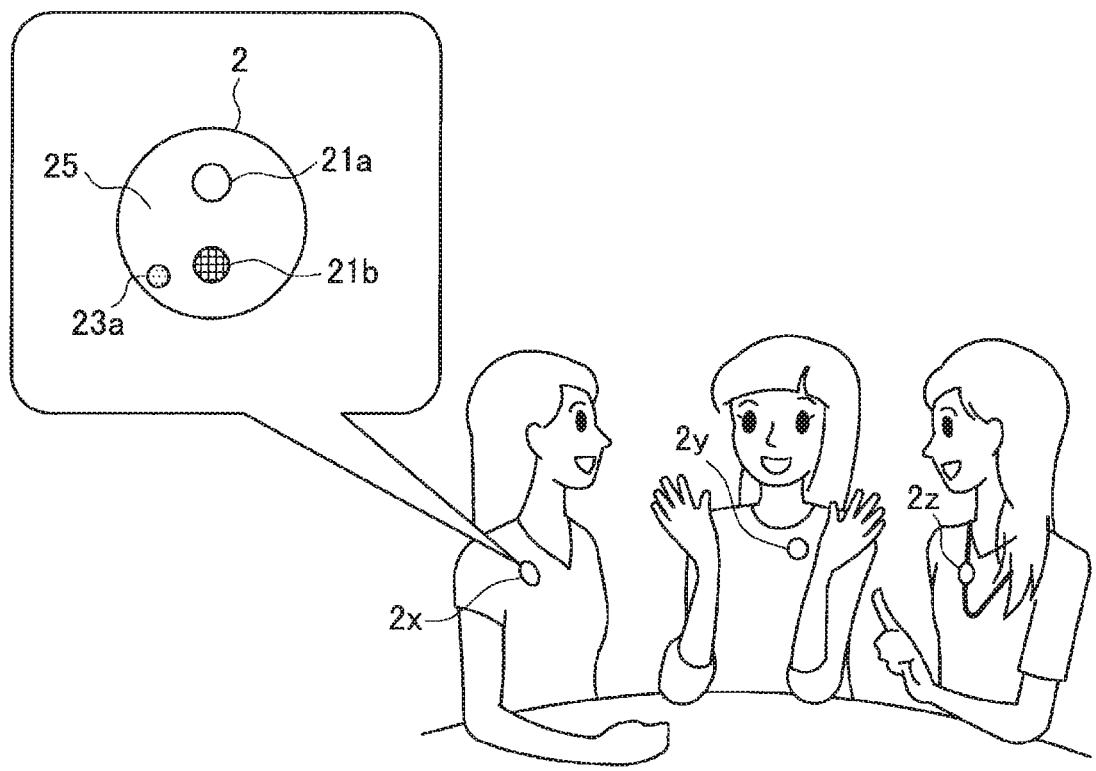
FIG. 4 is a diagram illustrating a badge type sensing device according to the embodiment.

FIG. 4 is a diagram illustrating a badge type sensing device 2 according to the embodiment. As illustrated in FIG. 4, badge type sensing devices 2x and 2y are mounted on a suit, a necklace, or the like by a mounting pin, a clip, or the like (not illustrated) mounted on back sides thereof. In addition, an imaging lens 21a, a directional microphone 21b, and an infrared communication unit 23a are installed on the front surface 25 of the sensing device 2. In addition, a processor, a network communication function, a battery, and the like are contained in the sensing device 2.

The imaging lens 21a can image an expression (for example, a "smile") of a conversation partner facing a wearer. In addition, in a case in which an imaging view angle of the imaging lens 21a is wide, an expression of the wearer can also be imaged. In addition, a voice (for example, words of gratitude such as "thank you") of only a conversation partner person facing the front of the wearer can be collected using the directional microphone 21b. In addition, in the case of a microphone that has upward directivity, speech of the wearer can also be collected. In addition, in a case in which people wearing the same badge type sensor device face each other, the infrared communication unit 23a can perform infrared communication. For example, the sensing device 2x transmits an object ID of the wearer to the sensing devices 2y and 2z through the infrared communication unit 23a. Thus, in a case in which interactions of the partner (the wearer of the sensing device 2z) acquired by the imaging lens 21a or the directional microphone 21b are extracted, the sensing devices 2y and 2z can transmit the object ID of the partner along with the interactions from the communication unit 23 to the emotion server 3.

<2-2. Emotion Server>

Figure 5:
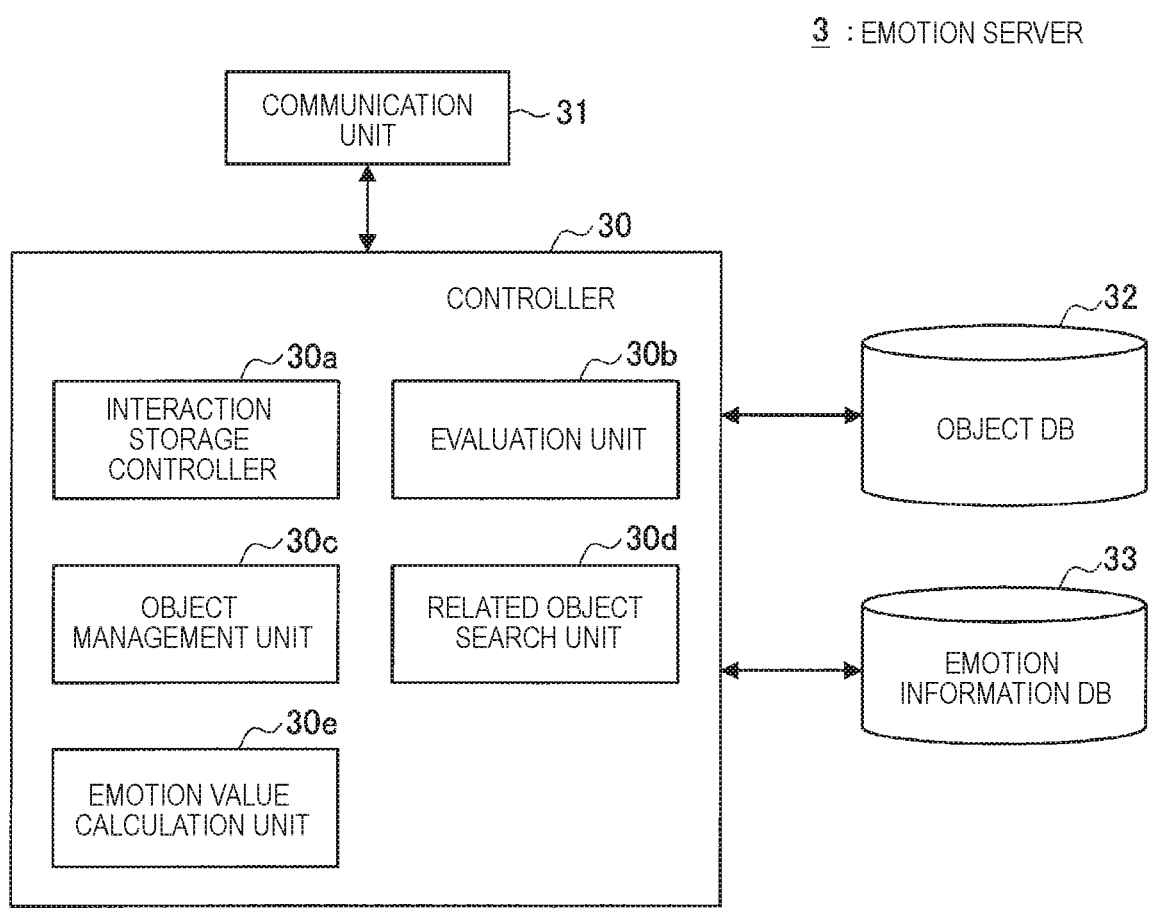
FIG. 5 is a diagram illustrating an example of the configuration of an emotion server according to the embodiment.

FIG. 5 is a diagram illustrating an example of the configuration of the emotion server 3 according to the embodiment. As illustrated in FIG. 5, the emotion server 3 includes a controller 30, a communication unit 31, an object database (DB) 32, and an emotion information DB 33.

(Controller)

The controller 30 is configured with a microcomputer that includes a CPU, a ROM, a RAM, and a nonvolatile memory and controls each configuration of the emotion server 3. In addition, as illustrated in FIG. 5, the controller 30 functions as an interaction storage controller 30a, an evaluation unit 30b, an object management unit 30c, a related object search unit 30d, and an emotion value calculation unit 30e.

The interaction storage controller 30a performs control such that interaction information received from the sensing device 2 is stored in the emotion information DB 33.

The evaluation unit 30b evaluates the interaction stored in the emotion information DB 33. A method of evaluating the interaction (action) is not particularly limited. For example, the evaluation unit 30b may grant a score (evaluation value) of −1.0 to 1.0 on the basis of a standard decided with any evaluation index. The granted evaluation value is stored in the emotion information DB 33 in association with the interaction.

The object management unit 30c performs management such as registration, changing, and deletion of information regarding an object stored in the object DB 32 (the object ID, name, and type, or the like).

The related object search unit 30d searches for a related object which is another object in which an interaction occurs with the object ID requested from an external device from an interaction history stored in the emotion information DB 33 and searches for information regarding the related object from the object DB 32. In the embodiment, particularly, a related object which is another object for which a positive interaction with the object ID requested from an external device occurs is retrieved.

The emotion value calculation unit 30e calculates an emotion value of the requested object on the basis of evaluations values in association with interactions accumulated in the emotion information DB 33. A method of calculating the emotion value is not particularly limited. For example, the emotion value calculation unit 30e according to the present embodiment may calculate a positive absolute emotion value of the requested object on the basis of a total value of all (or the one for a certain period) the positive interaction evaluation values occurring between the requested object and other objects. In addition, the emotion value calculation unit 30e may calculate the positive absolute emotion value of the requested object on the basis of an average value of all (or the one for a certain period) the positive interaction evaluation values. Alternatively, the emotion value calculation unit 30e can also perform weighting by the type of interaction and then calculate the positive absolute emotion value on the basis of the total value, the average value, or the like.

Alternatively, the emotion value calculation unit 30e can also calculate a relative emotion value of a requested object to a specific (or a specific type of) object on the basis of a total value, an average value, or the like of positive interaction evaluation values occurring between the requested object and the specific object.

(Communication Unit)

The communication unit 31 receives interaction information from the sensing devices 2 or receives an emotion value acquisition request from the bias calculation server 4 via the network 5. In addition, the communication unit 31 replies with an emotion value based on the positive interaction evaluation value calculated by the emotion value calculation unit 30e in response to the emotion value acquisition request from the bias calculation server 4.

(Object DB)

The object database 32 stores adjunctive information regarding each object, for example, a name (a personal name or an item name), a type (sex or category), identification information (a face image, biometric information, a serial number, a model, and a maker ID), and the like in association with the object ID of each object (including a person and an article).

(Emotion Information DB)

The emotion information DB 33 stores information regarding interactions (interaction information) between objects which is used to calculate an emotion value. Here, an example of the interaction information is illustrated in FIG. 6. FIG. 6 is a diagram illustrating an example of the interaction information stored in the emotion information DB 33 according to the embodiment.

As illustrated in FIG. 6, the interaction information includes, for example, an object ID with which an interaction is performed/received, a date/time and a place in which the interaction occurs, a related object ID related to the interaction (that is, of a partner side of the interaction), a type of the interaction, details of the interaction, and an evaluation value. In addition, for example, various actions such as expression, conversation (speech content), telephony, mailing, maintenance, safekeeping, cleaning, discarding, purchase, donation, manipulation, use, and the like are assumed as the types of interactions. In addition, the details of the interaction indicate, for example, information regarding an expression, the degree of smiling in the case of a smile, words (conversation or speech), a motion, and the like. Also, an emotion value calculated by the emotion value calculation unit 30e may be associated with the emotion information DB 33 to be stored.

The configuration of the emotion server 3 according to the embodiment has been described specifically above. As described above, the emotion server 3 can accumulate information regarding various interactions (interaction information) and calculate an emotion value on the basis of the interaction evaluation value. In the embodiment, however, positive interactions are particularly focused on to calculate emotion values of positive interactions.

Also, the configuration of the emotion server 3 is not limited to the example illustrated in FIG. 5. For example, the object DB 32 and the emotion information DB 33 may be stored in an external storage device on a network (on a cloud).

<2-1. Bias Calculation Server>

Figure 7:
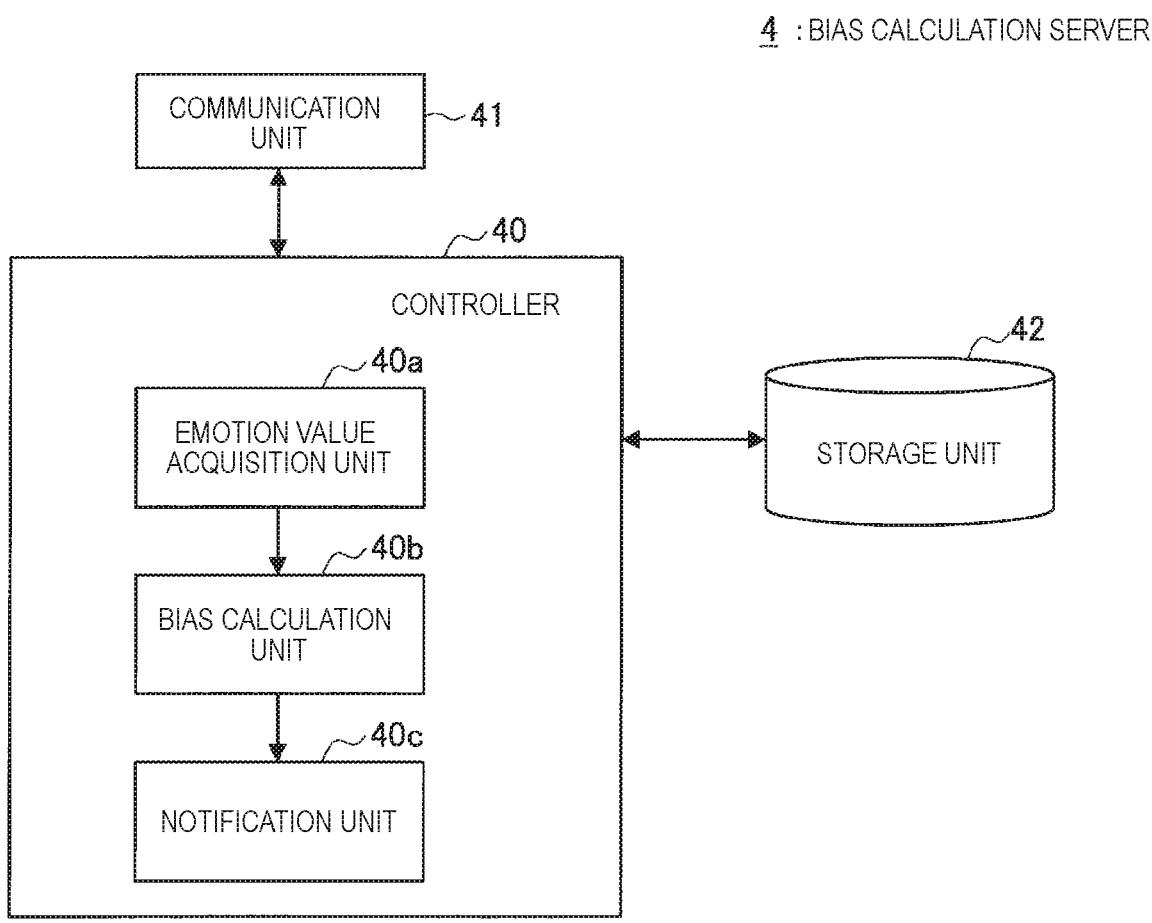
FIG. 7 is a diagram illustrating an example of the configuration of a bias calculation server according to the embodiment.

FIG. 7 is a diagram illustrating an example of the configuration of the bias calculation server 4 according to the embodiment. As illustrated in FIG. 7, the bias calculation server 4 includes a controller 40, a communication unit 41, and a storage unit 42.

(Controller)

The controller 40 is configured with a microcomputer that includes a CPU, a ROM, a RAM, and a nonvolatile memory and controls each configuration of the bias calculation server 4. In addition, as illustrated in FIG. 7, the controller 40 functions as an emotion value acquisition unit 40a, a bias calculation unit 40b, and a notification unit 40c.

The emotion value acquisition unit 40a has a function of acquiring an emotion value of a specific user from the emotion server 3 via the communication unit 41. More specifically, the emotion value acquisition unit 40a requests an emotion value based on the positive interactions accumulated within a predetermined period from the emotion server 3 on the basis of the object ID of the specific user to acquire the emotion value. In addition, the emotion value acquisition unit 40a may request the emotion value from the emotion server 3 on the basis of an object ID requested from a cloud server or an application in which a bias value to be described below or an emotion value based on positive interactions of a specific person is output to another person for use.

The bias calculation unit 40b calculates a bias value on the basis of the emotion value of the positive interaction of the specific user acquired by the emotion value acquisition unit 40a. For example, the bias calculation unit 40b smoothes a previous temporal change of the emotion value and obtains an average emotion value (referred to here as a "bias value") of the specific person within a given period.

The notification unit 40c performs control such that the cloud server or the application in which a bias value or an emotion value of positive interactions is output to another person for use is notified of the bias value or the emotion value.

(Communication Unit)

The communication unit 41 receives the emotion value of the positive interactions from the emotion server 3 via the network 5. In addition, under the control of the notification unit 40c, the communication unit 41 transmits the calculated bias value of the positive interactions to the cloud server or the application in which the bias value is output to another person for use.

(Storage Unit)

The storage unit 42 stores a program used for the controller 40 to perform each process or parameters necessary to perform each process. In addition, the storage unit 42 may temporarily store the calculated bias value.

<<3. Embodiments>>

The overview and the overall configuration of the information processing system and the configuration of each device included in the information processing system according to the embodiment have been described above. The emotion value or the bias value of the positive interactions described above are used for various services or control. Finally, the happiness of society overall is improved. Here, a plurality of embodiments will be described as examples in regard to use of the bias value or the like of the positive interactions.

<3-1 First Embodiment>

A first embodiment relates to a two-way smile support system capable of supporting smiling of both a target person and another person. The two-way smile support system controls an expression of a stuffed toy or a doll owned by another person in accordance with a bias value based on accumulated positive interactions of the target person or an emotion value based on a real-time positive interaction. Hereinafter, an overview of this system will be described with reference to FIG. 8.

(3-1-1. Overview)

Figure 8:
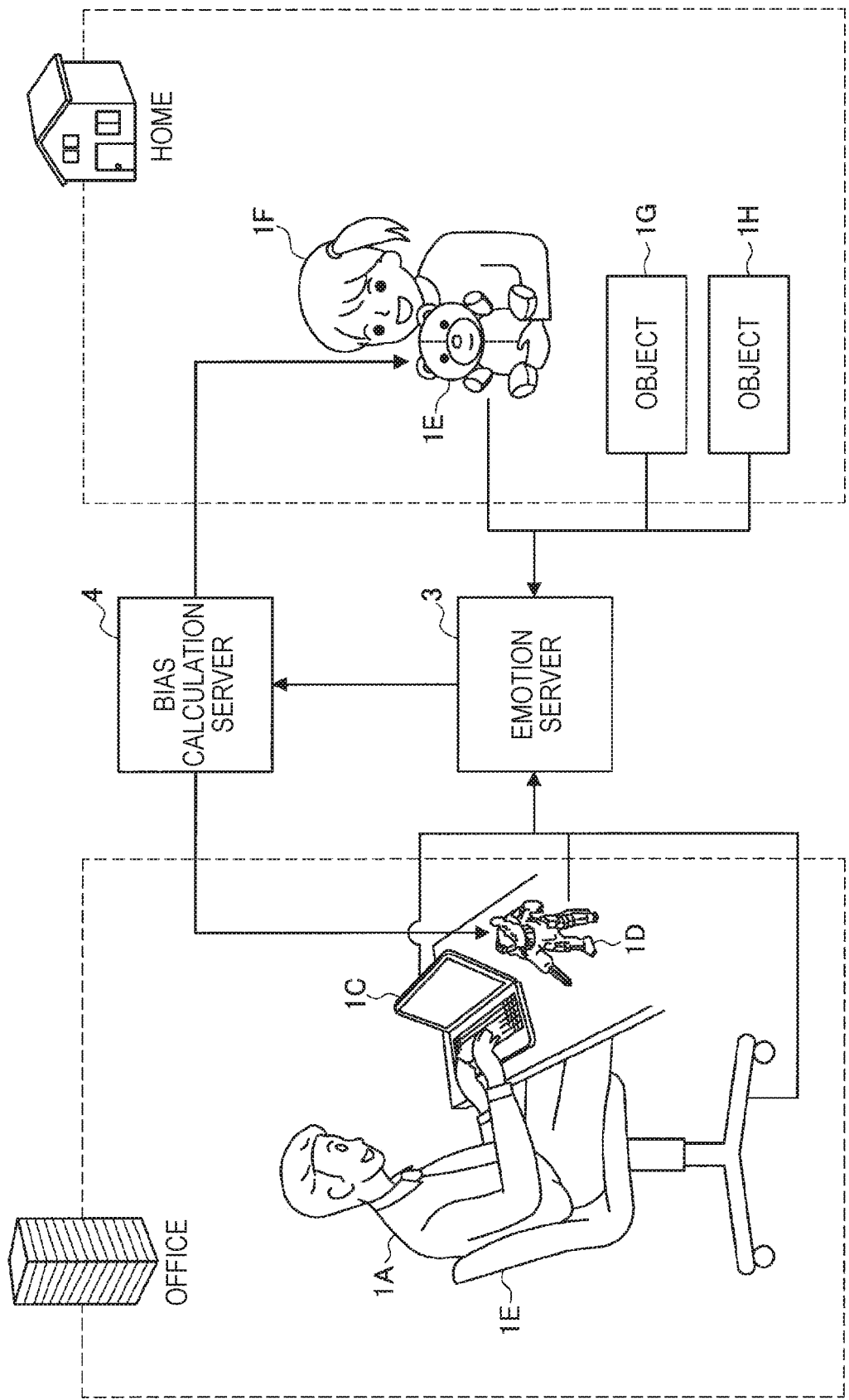
FIG. 8 is an explanatory diagram illustrating an overview of a two-way smile support system according to a first embodiment.

FIG. 8 is an explanatory diagram illustrating an overview of the two-way smile support system according to a first embodiment. The two-way smile support system according to the embodiment supports, for example, smiling of a father (an object 1A) in an office and a daughter (an object 1F) at home, as illustrated in FIG. 8 for example. Specifically, for example, in a case in which the father in the office smiles or says words of gratitude such as "thank you," such a positive interaction is detected by a surrounding object 1C, 1D, or 1E, or the like and is transmitted to the emotion server 3. Here, for example, the object 1C is a laptop personal computer (PC), the object 1D is a doll on a table, and the object 1E is a chair. In addition, the object receiving the interaction of the father (the object 1A) may be another person (not illustrated) in the office. In this case, an interaction such as "smile" is detected by the sensing device 2 worn by the person and is transmitted to the emotion server 3.

Subsequently, the bias calculation server 4 acquires an emotion value based on the accumulated positive interactions of the father calculated by the emotion server 3, calculates a bias value of the positive interaction emotion value on the basis of the emotion value, and transmits the bias value to a stuffed toy (the object 1E) of the daughter at home. An application of operation control in accordance with the bias value is mounted on the stuffed toy (the object 1E) and causes the stuffed toy to smile or reproduces a sound of laughter in accordance with the bias value of the positive interaction of the father.

Thus, when the father smiles or says words of gratitude at work, the stuffed toy of the daughter also smiles at home, and thus the daughter can be pleased. In addition, when the stuffed toy smiles or reproduces the sound of laughter, the daughter also laughs reflexively or embraces the stuffed toy. Therefore, such an interaction can be detected by the objects 1E to 1H and control can be performed in a reverse direction at that moment. For example, the bias calculation server 4 acquires an emotion value based on accumulated positive interactions of the daughter calculated by the emotion server 3, calculates a bias value of the positive interaction emotion value on the basis of the emotion value, and transmits the bias value to the doll (the object 1D) on the table of the father in the office. An application of operation control in accordance with the bias value is mounted on the doll (the object 1D) and the doll smiles or changes its pose in accordance with the bias value of the positive interactions of the daughter. In addition, the bias calculation server 4 may perform control such that the chair (the object 1E) on which the father sits vibrates or tightens similarly to the child's embrace in accordance with an emotion value of a positive interaction "embracing the stuffed toy," which is a real-time interaction of the daughter.

Thus, even when the daughter does not understand the meaning of the entire system, the daughter can be pleased that her father is working with a smile as a result. In addition, when the result is also fed back to the father, two-way smiling can be supported. Also, the embodiment is not limited to an active positive interaction in which a specific person smiles or says words of gratitude. An inactive positive interaction in which a specific person receives a smile or words of gratitude may be included and a positive interaction of the specific person may be fed back.

(3-1-2. Configuration of Object)

Here, an object 1, such as the stuffed toy (the object 1E) or the doll (the object 1D), that feeds a positive interaction back will be described specifically with reference to FIG. 9.

Figure 9:
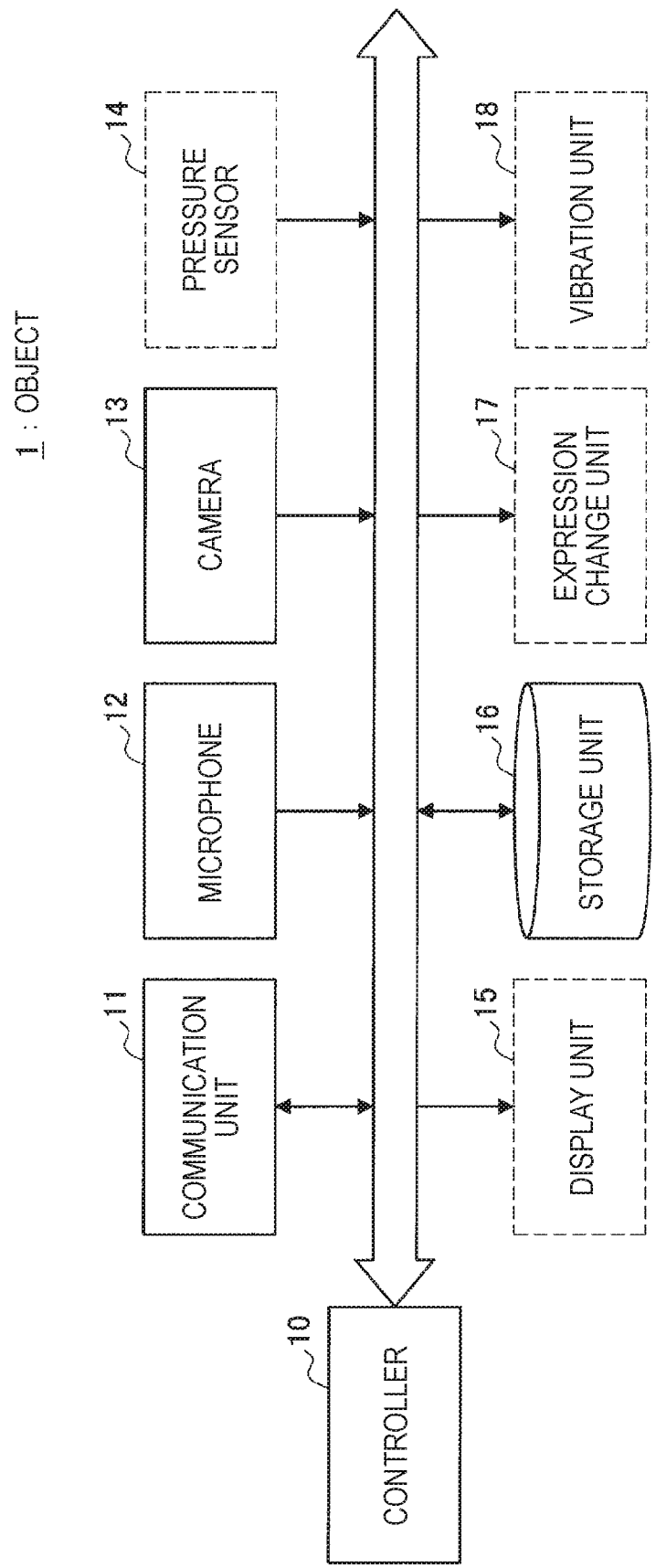
FIG. 9 is a diagram illustrating an example of a configuration of an object that feeds a positive interaction back according to the first embodiment.

FIG. 9 is a diagram illustrating an example of a configuration of the object 1 that feeds a positive interaction back according to the first embodiment. As illustrated in FIG. 9, the object 1 includes a controller 10, a communication unit 11, a microphone 12, a camera 13, a pressure sensor 14, a display unit 15, a storage unit 16, an expression change unit 17, and a vibration unit 18.

The controller 10 is configured with a microcomputer that includes a CPU, a ROM, a RAM, and a nonvolatile memory and controls each configuration of the object 1. The controller 10 according to the embodiment transmits an interaction detected by the microphone 12, the camera 13, the pressure sensor 14, or the like to the emotion server 3 via the communication unit 11. In addition, the controller 10 performs control such that the display unit 15, the expression change unit 17, or the vibration unit 18 feeds a positive interaction back in accordance with a bias value of a positive interaction of a specific person received from the bias calculation server 4 or an emotion value of a real-time positive interaction.

The communication unit 11 is connected to an external device in a wireless/wired manner to transmit and receive data.

The microphone 12 has a function of collecting surrounding sounds and outputting sound data to the controller 10. For example, the microphone 12 collects words of gratitude such as "thank you."

The camera 13 has a function of imaging surroundings and outputting captured images to the controller 10. For example, the camera 13 images a smile of a surrounding person.

The pressure sensor 14 is mounted, for example, in a case in which the object 1 is the stuffed toy (the object 1E) illustrated in FIG. 8 and has a function of detecting that the stuffed toy is embraced by the daughter.

The display unit 15 is mounted, for example, in a case in which the object 1 is the PC (the object 1C) illustrated in FIG. 8 and displays a smile character (an avatar image or the like) under the control of the controller 10.

The storage unit 16 stores a program or parameters used for the controller unit 10 to perform each of the foregoing processes.

The expression change unit 17 is mounted, for example, in a case in which the object 1 is the doll (the object 1D) or the stuffed toy (the object 1E) illustrated in FIG. 8 and changes an expression under the control of the controller 10. For example, in the case of the stuffed toy, the expression change unit 17 is realized by springs or motors moving eyebrows, eyes, the mouth (or limbs) formed on the face of the stuffed toy and actuators such as artificial muscles, so that an expression of the stuffed toy can be changed. In addition, the expression change unit 17 may be realized by a liquid crystal screen or an electronic paper installed in the face of the stuffed toy or the doll. In this case, the expression change unit 17 can change an expression by graphics drawing.

The vibration unit 18 is mounted, for example, in the case in which the object 1 is the chair (the object 1E) illustrated in FIG. 8 and performs control such that vibration is performed or the father sitting on the chair is tightened in accordance with an emotion value of a real-time positive interaction in which the daughter is embracing the stuffed toy under the control of the controller 10.

(3-1-3. Operation Process)

Next, an operation process of the two-way smile support system according to the embodiment will be described specifically with reference to FIGS. 10 to 12.

Figure 10:
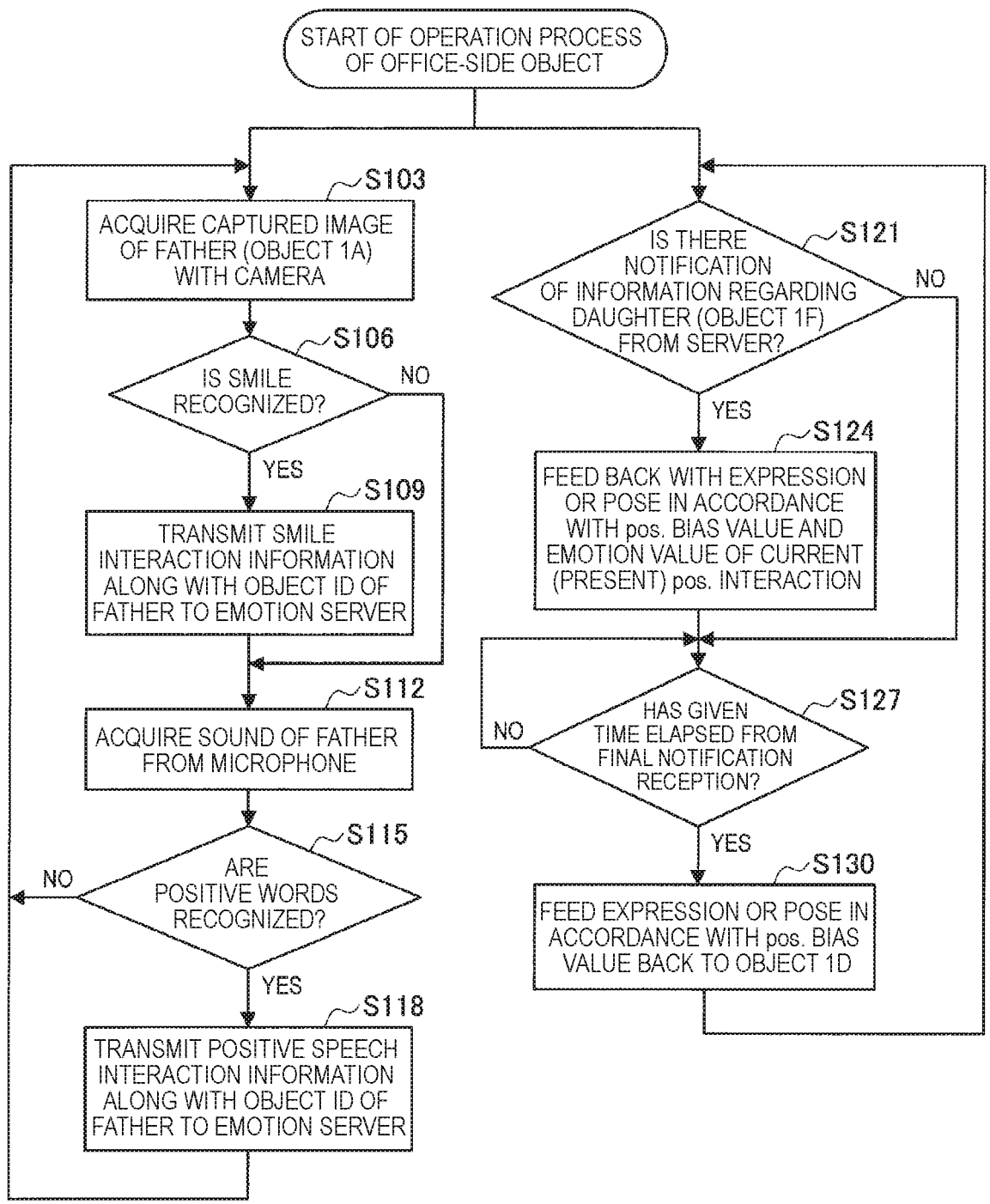
FIG. 10 is a flowchart illustrating an operation process of an office-side object according to the first embodiment.

FIG. 10 is a flowchart illustrating an operation process of an office-side object. As illustrated in FIG. 10, the operation process of the office-side object includes an interaction detection process indicated in S103 to S118 and a feedback process indicated in S121 to S130. These processes may be performed in sequence or in parallel.

In step S103, the office-side object (for example, the objects 1C and 1D) first acquires a captured image of the father (the object 1A) with the mounted camera 13. The acquisition of the captured image may be performed continuously.

Subsequently, in a case in which a smile can be recognized from the captured image (Yes in step S106), the office-side object transmits the object ID of the father, the ID of the object recognizing the smile, and smile interaction information to the emotion server 3 in step S109.

Subsequently, in step S112, the office-side object (for example, the objects 1C, 1D, and 1E) acquires a sound of the father (the object 1A) with the mounted microphone 12. The acquisition of the sound may be performed continuously.

Subsequently, in a case in which positive words such as "thank you" can be recognized from sound data (Yes in step S15), the office-side object transmits the object ID of the father, the ID of the object recognizing the gratitude words, and the positive speech interaction information to the emotion server 3 in step S118.

S103 to S118 described above are repeated continuously. In addition, the processes of S103 to S109 and the processes of S112 to S118 may be performed in parallel.

Subsequently, in a case in which there is a notification of information regarding the daughter (the object 1F) from the bias calculation server 4 (Yes in step S121), the office-side object feeds the positive bias value (in FIG. 10, abbreviated to a pos. bias value) back in step S124. For example, the object 1D of the doll is controlled such that its body is widened and a smile appears in a neutral state as the positive bias value is higher. The object 1D of the doll is controlled such that its shoulder sags and the smile disappears in a case in which the positive bias value is low. In addition, in a case in which the positive bias value is less than a threshold, the object is controlled such that the object kneels and takes a disappointment pose and a sad face appears. In addition, in a case in which there is an emotion value (that is, an evaluation value) of a current (present, that is, real-time) interaction, the object 1D of the doll may perform feedback on the basis of a value added by weighting the emotion value or may perform the feedback preferring the emotion value.

Next, in a case in which a given time has elapsed from the final notification reception from the bias calculation server 4 (Yes in step S127), the office-side object changes to feedback with an expression or a pose in accordance with the positive bias value without consideration of the emotion value of the current (real-time) interaction in step S130.

Figure 11:
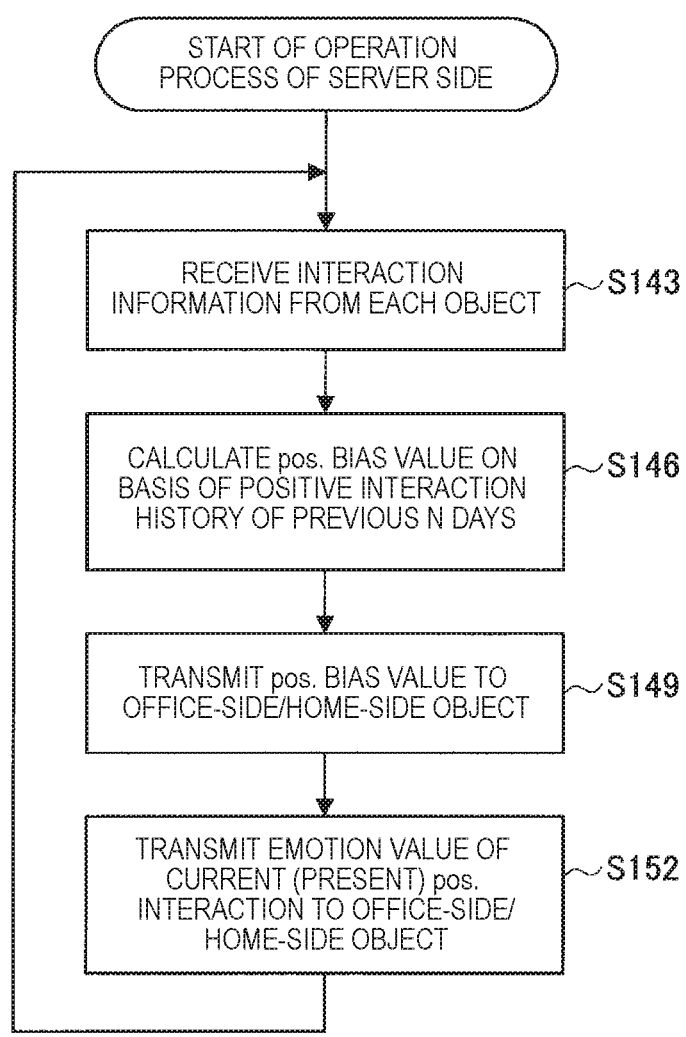
FIG. 11 is a flowchart illustrating an operation process of a server side according to the first embodiment.

FIG. 11 is a flowchart illustrating an operation process of a server side. As illustrated in FIG. 11, in step S143, the emotion server 3 first receives the interaction information from each object 1 and accumulates the interaction information in the emotion information DB 33. At this time, the interaction information may be stored every time in association with evaluation granted by the evaluation unit 30b.

Subsequently, in step S146, the bias calculation server 4 calculates a positive bias value on the basis of, for example, a positive interaction history (specifically, smile interactions and positive speech interactions) of previous n days of a specific person (in the embodiment, the father or the daughter). The positive interaction history of the previous n days is extracted from the emotion information DB 33 of the emotion server 3.

Subsequently, in step S149, the bias calculation server 4 transmits the calculated positive bias value to the office-side object or the home-side object. For example, the bias calculation server 4 transmits the positive bias value of the father calculated on the basis of the emotion value of the positive interaction detected by the office-side object to a home-side object near the daughter. In contrast, the positive bias value of the daughter calculated on the basis of the emotion value of the positive interaction detected by the home-side object is transmitted to the office-side object near the father. Also, a combination of the father and the daughter, places where they reside, or the like may be set in advance or may be set dynamically on the basis of positional information of the father or the daughter.

Then, in step S152, in a case in which the positive interaction is detected in real time, the bias calculation server 4 transmits an emotion value (evaluation value) of the positive interaction to the office-side object or the home-side object.

Figure 12:
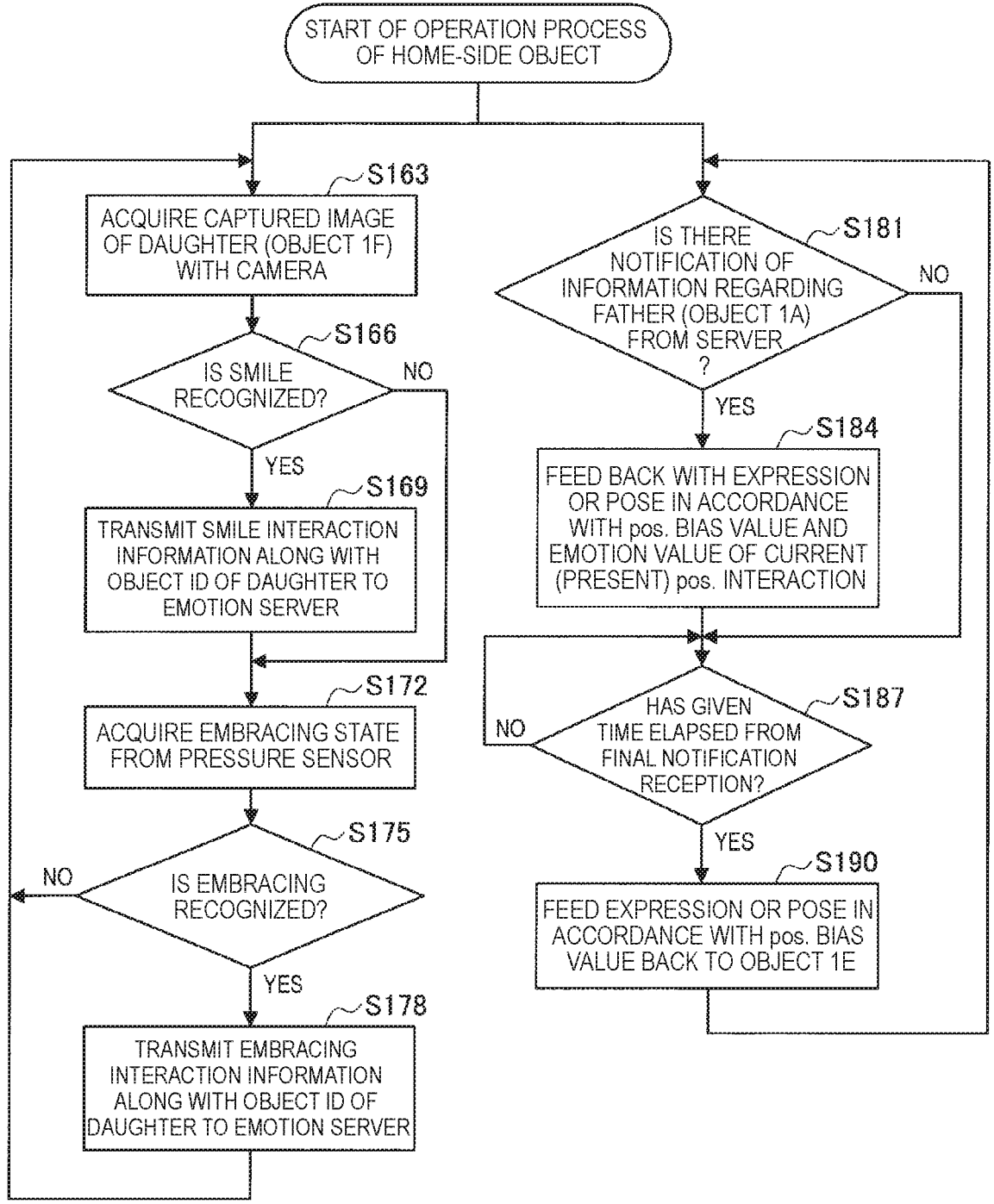
FIG. 12 is a flowchart illustrating an operation process of a home-side object according to the first embodiment.

FIG. 12 is a flowchart illustrating an operation process of a home-side object. As illustrated in FIG. 12, the operation process of the home-side object includes an interaction detection process indicated in S163 to S178 and a feedback process indicated in S181 to S190. These processes may be performed in sequence or in parallel.

In step S163, the home-side object (for example, the objects 1E, 1G and 1H) first acquires a captured image of the daughter (the object 1F) with the mounted camera 13. The acquisition of the captured image may be performed continuously.

Subsequently, in a case in which a smile can be recognized from the captured image (Yes in step S166), the home-side object transmits the object ID of the daughter, the ID of the object recognizing the smile, and smile interaction information to the emotion server 3 in step S169.

Subsequently, in step S172, the home-side object (for example, the object 1E) acquires an embracing state with the mounted pressure sensor 14. The acquisition of the embracing state may be performed continuously.

Subsequently, in a case in which the embracing state of the daughter is recognized (Yes in step S175), the home-side object transmits the object ID of the daughter, the ID of the object recognizing the embracing state, and the embracing interaction information to the emotion server 3 in step S178.

S163 to S178 described above are repeated continuously. In addition, the processes of S163 to S169 and the processes of S172 to S178 may be performed in parallel.

Subsequently, in a case in which there is a notification of information regarding the father (the object 1A) from the bias calculation server 4 (Yes in step S181), the home-side object feeds the positive bias value (in FIG. 12, abbreviated to a pos. bias value) back in step S184. For example, the object 1E of the stuffed toy is controlled such that a smile appears in a neutral state as the positive bias value is higher. The object 1E of the stuffed toy is controlled such that the smile disappears in a case in which the positive bias value is low. In addition, in a case in which the positive bias value is less than a threshold, the object is controlled such that a sad face appears. In addition, in a case in which there is an emotion value (that is, an evaluation value) of a current (present, that is, real-time) interaction, the object 1E of the stuffed toy may perform feedback on the basis of a value added by weighting the emotion value or may perform the feedback preferring the emotion value.

Next, in a case in which a given time has elapsed from the final notification reception from the bias calculation server 4 (Yes in step S187), the home-side object changes to feedback with an expression or a pose according to the positive bias value without consideration of the emotion value of the current (real-time) interaction in step S190.

Here, a difference in an expression change of the stuffed toy in accordance with the bias value or the emotion value will be described with reference to FIGS. 13 and 14.

Figure 13:
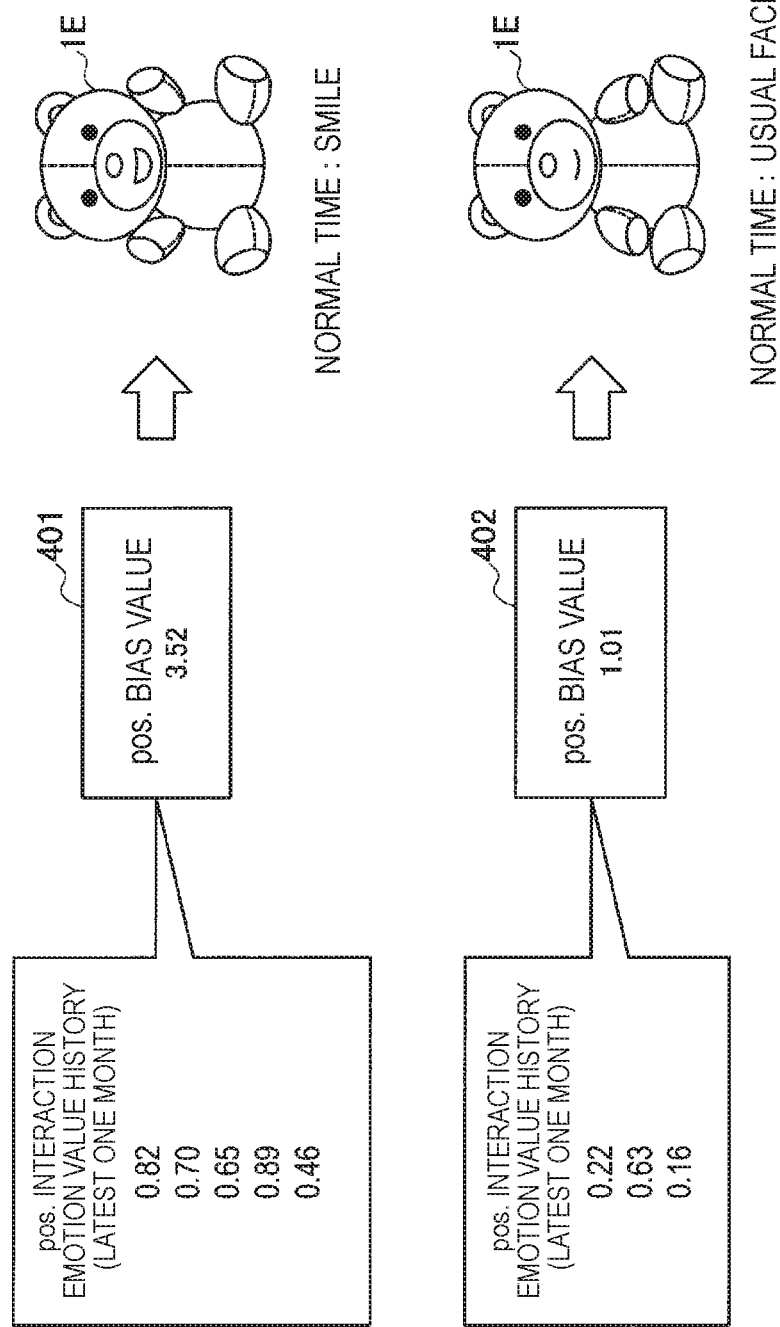
FIG. 13 is an explanatory diagram illustrating a difference in expression control of a stuffed toy in accordance with different biases at neutral times according to the first embodiment.

FIG. 13 is an explanatory diagram illustrating a difference in expression control of the stuffed toy according to different biases at the neutral time (at the time of a normal state in which a real-time interaction does not occur). On the upper side of FIG. 13, for example, expression control of the object 1E in a case in which a positive bias value 401 calculated on the basis of a positive interaction emotion value history of previous one month is "3.52" is illustrated. On the lower side of FIG. 13, expression control of the object 1E in a case in which a positive bias value 402 is "1.01" is illustrated.

As illustrated on the upper side of FIG. 13, in a case in which the positive bias value 401 is high (for example, a smile threshold is equal to or greater than "2"), control is performed such that the stuffed toy raises both hands and a smile state in which the stuffed toy opens its mouth and smiles is realized. On the other hand, as illustrated on the lower side of FIG. 13, in a case in which the positive bias value 402 is low (for example, a smile threshold is less than "2"), control is performed such that the stuffed toy lowers both hands and a usual face state in which the stuffed toy shuts its mouth is realized.

Also, in the example illustrated in FIG. 13, the bias value is calculated by adding the positive interaction emotion value history, but the embodiment is not limited thereto. Weighting to a latest value may be performed, and then the positive interaction emotion value history may be added for calculation.

In addition, as described above, in a case in which notification of an emotion value (hereinafter referred to as a positive interaction evaluation value since one interaction evaluation value is used herein) in accordance with a real-time interaction is issued along with the bias value, the object 1E performs expression control also in consideration of the positive interaction evaluation value. In this case, the expression control of the stuffed toy is performed such that a "smile" appears or a "very smile" appears in accordance with the magnitude of the bias value serving as a base. Hereinafter, the description will be made with reference to FIG. 14.

Figure 14:
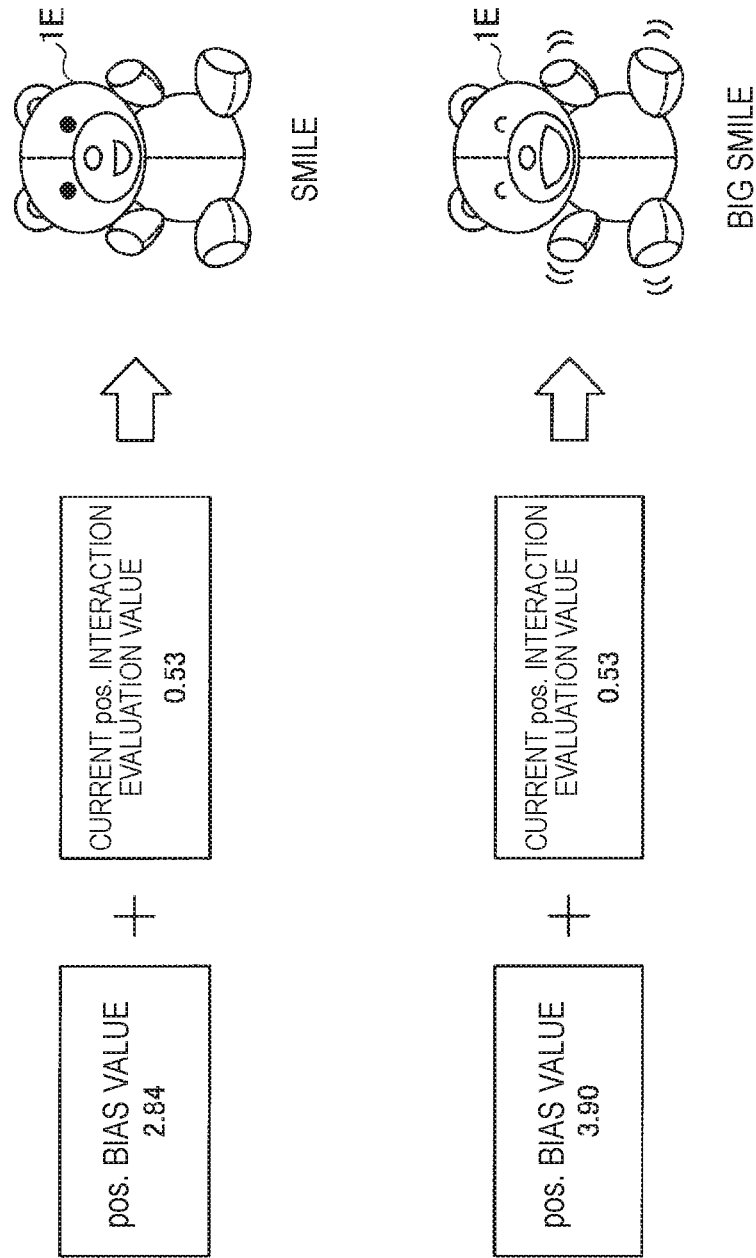
FIG. 14 is an explanatory diagram illustrating a difference in expression control of a stuffed toy at the time of occurrence of a real-time interaction in a case in which a positive bias value is different according to the first embodiment.

FIG. 14 is an explanatory diagram illustrating a difference in expression control of the stuffed toy at the time of occurrence of a real-time interaction in a case in which a positive bias value is different. For example, even when the real-time positive interaction evaluation values are the same as "0.53," expression control of the object 1E corresponding to a person for which the positive bias value serving as a base is "2.84," as illustrated on the upper side of FIG. 14, is different from expression control in a case in which the positive bias value is "3.90," as illustrated in the lower side of FIG. 14.

That is, as illustrated on the upper side of FIG. 14, in a case in which the positive bias value is "2.84," a value "3.37" obtained by adding "0.53" to the positive interaction evaluation value is, for example, equal to or greater than the smile threshold "2," but is less than a big smile threshold "4." Therefore, the expression of the stuffed toy is controlled to a smile state. On the other hand, as illustrated in the lower side of FIG. 14, in a case in which the positive bias value is "3.90," a value "4.43" obtained by adding "0.53" to the positive interaction evaluation value is, for example, equal to or greater than the big smile threshold "4." Therefore, the expression of the stuffed toy is controlled to a very smile state and, in addition, control is performed such that the limbs of the stuffed toy move.

In this way, when the positive interactions are accumulated in everyday life and a person for which the positive bias value is considerably high smiles, a corresponding expression of the stuffed toy is controlled to a "big smile." In a case in which a person for which the positive interactions are not so accumulated smiles, the expression of the stuffed toy is controlled to a "smile."

The two-way smile support system according to the first embodiment has been described above. Thus, since each person smiles in everyday life or is conscious of behavior such as expressing gratitude with words, happiness of the whole society is improved.

<3-2. Second Embodiment>

Next, a second embodiment of the present disclosure will be described with reference to FIGS. 15 and 16. The second embodiment relates to an insurance fee setting system that changes an insurance fee in accordance with a smile. In the system, in consideration of contribution to health in which immunity is strengthened when a person smiles or laughs much, the person who laughs a lot in everyday life and feels happiness is estimated to get diseases less and an insurance fee is reduced for the person. Thus, in order to reduce an insurance fee, each person endeavors to live with his or her smile. Therefore, smiles and laughter increase and happiness of the whole society is improved. Hereinafter, an overview of the system will be described with reference to FIG. 15.

(3-2-1. Overview)

Figure 15:
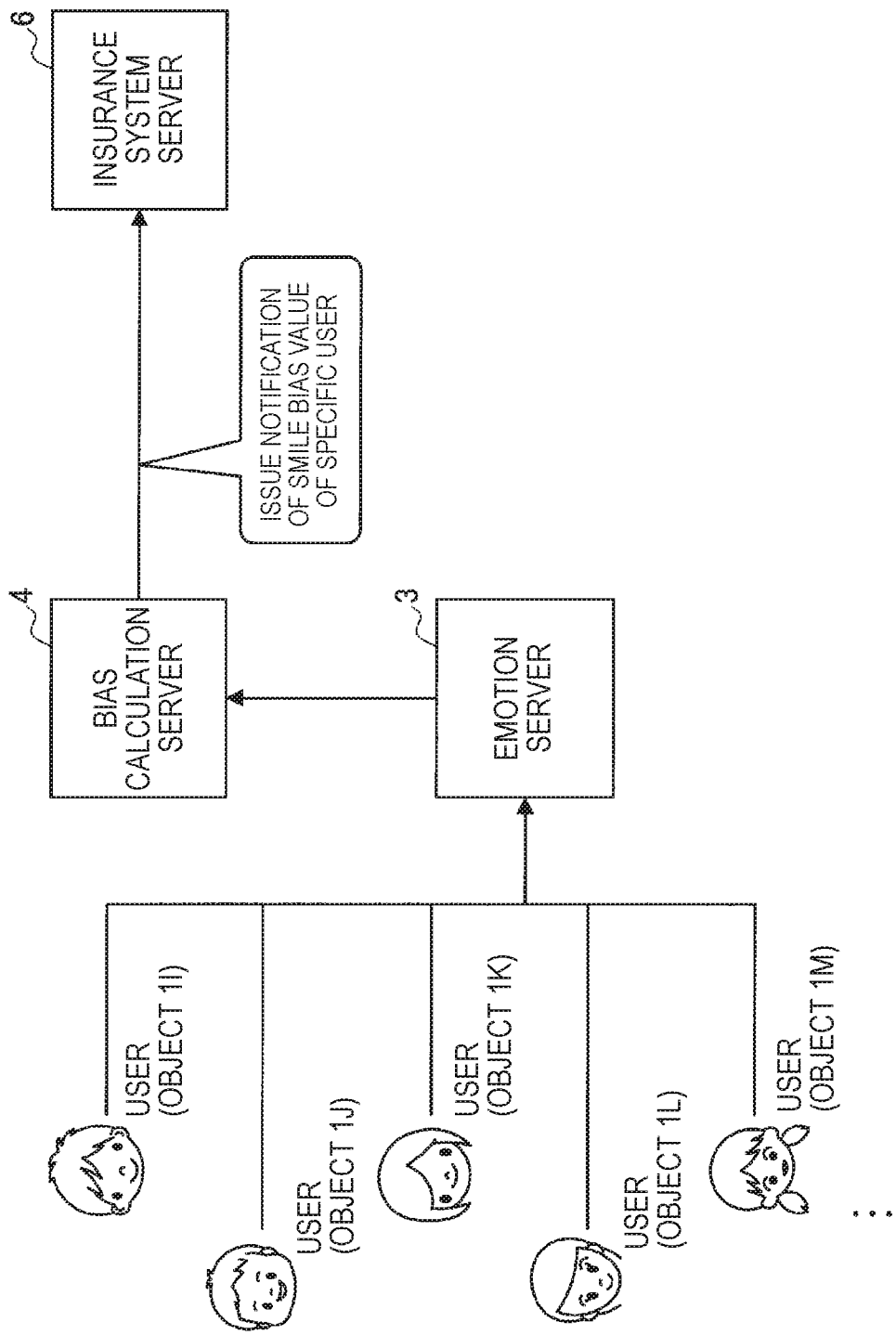
FIG. 15 is an explanatory diagram illustrating an overview of an insurance fee setting system according to a second embodiment.

FIG. 15 is an explanatory diagram illustrating an overview of the insurance fee setting system according to the second embodiment. As illustrated in FIG. 15, the insurance fee setting system includes the emotion server 3, the bias calculation server 4, and an insurance system server 6.

The emotion server 3 accumulates interaction information of each of users (objects 1I to IM) in everyday life and transmits an emotion value based on a smile interaction evaluation value of a specific user to the bias calculation server 4 as necessary.

The bias calculation server 4 acquires the emotion value based on the smile interaction evaluation value of the specific user from the emotion server 3 on the basis of the object ID of the specific user, for example, in response to a request from the insurance system server 6, calculates a smile bias value, and replies to the insurance system server 6.

When an insurance fee of a specific contractor is reviewed for each given period (for example, every month or every year), the insurance system server 6 designates an object ID of the specific contractor and requests the smile bias value from the bias calculation server 4. The insurance system server 6 performs revision of an insurance fee on the basis of the smile bias value of the specific contractor (that is, a specific user) received from the bias calculation server 4. Specifically, for example, the insurance system server 6 sets a lower insurance fee as the smile bias value is higher, and sets a higher insurance fee as the smile bias value is lower.

(3-2-2. Operation Process)

Next, an operation process according to the embodiment will be described with reference to FIG. 16. FIG. 16 is a flowchart illustrating an operation process of the insurance fee setting system according to the second embodiment.

Figure 16:
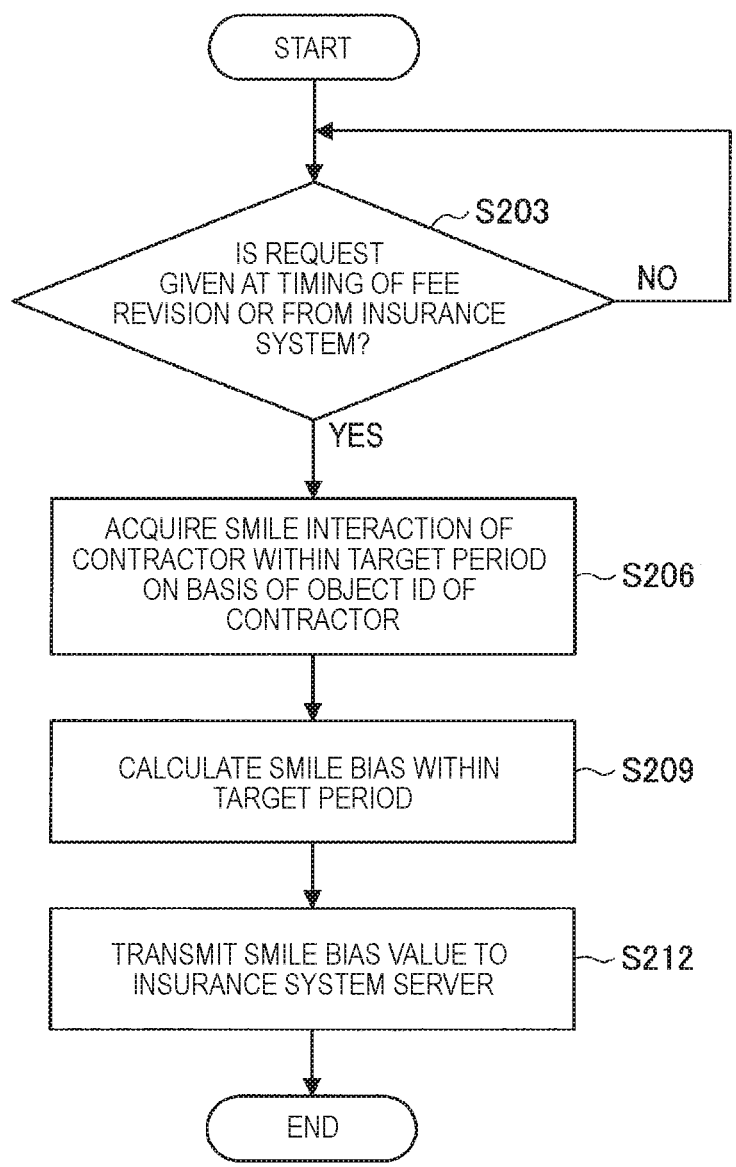
FIG. 16 is a flowchart illustrating an operation process of the insurance fee setting system according to the second embodiment.

As illustrated in FIG. 16, in a case in which a request (a request of a smile bias value of the specific user) is first given at a timing of free revision or from the insurance system server 6 (Yes in step S203), the bias calculation server 4 acquires a smile interaction of the contractor within a target period from the emotion server 3 on the basis of the object ID (which can be designated by the insurance system server 6) of the contractor in step S206.

Subsequently, in step S209, the bias calculation server 4 calculates a smile bias value of the contractor (the specific user) within the target period.

Then, in step S212, the bias calculation server 4 transmits the calculated smile bias value to the insurance system server 6. Thus, the insurance system server 6 can perform an insurance fee revision process in accordance with the smile bias value.

The insurance fee setting system according to the embodiment has been described above. Also, since a specific process by the insurance system server 6 is performed in another system (external server) such as an insurance system, the details thereof will be omitted.

In addition, in the above-described embodiment, the smile bias value has been supplied to the insurance system server 6 using the smile interaction, but the embodiment is not limited thereto. A negative bias value may be calculated using negative interactions such as angers or yelling and may be supplied to the insurance system server 6. It is known that when people feel negative feelings, people feel stress and stress substances (cortisol and the like) secreted due to the stress have adverse influences on bodies. Therefore, in a case in which the negative bias value is high, an insurance fee can also be expensive. In a case in which the negative bias value is low, an insurance fee can also be cheap.

In addition, for the above-described insurance fee, cancer insurance, medical insurance, life insurance, social insurance, health insurance, or the like can be assumed. In addition, the system can also be applied to granting of a loan interest, income tax expenses, various coupons, or the like.

<3-3. Third Embodiment>

Next, a third embodiment of the present disclosure will be described with reference to FIGS. 17 to 22. The third embodiment relates to a spouse searching system that supplies an emotion value calculated by specifying a positive interaction to a spouse searching (abbreviation for marriage activities) system server performing matching marriage partners. Hereinafter, an overview of the system will be described with reference to FIG. 17.

(3-3-1. Overview)

Figure 17:
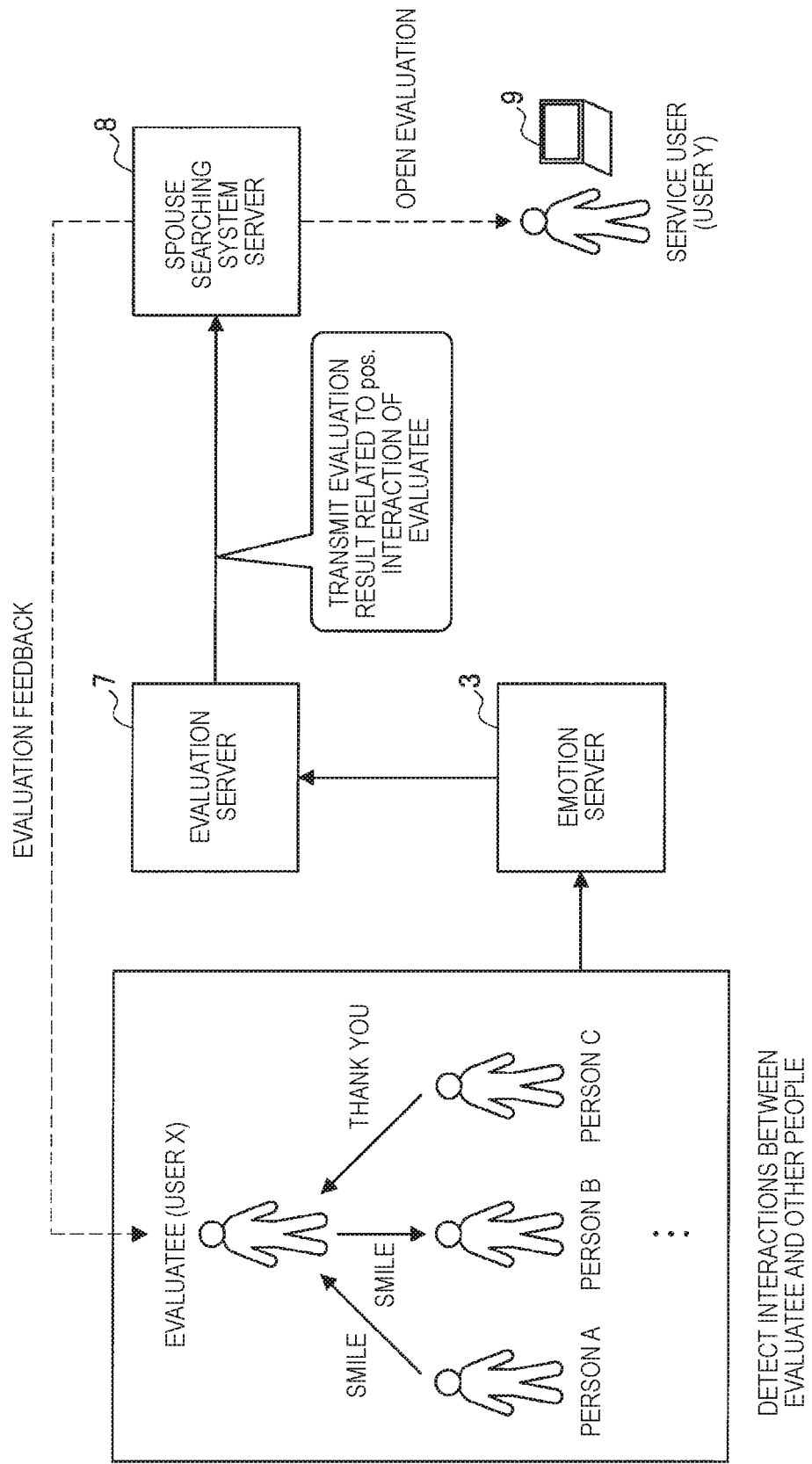
FIG. 17 is an explanatory diagram illustrating an overview of a spouse searching system according to a third embodiment.

FIG. 17 is an explanatory diagram illustrating an overview of a spouse searching system according to a third embodiment. As illustrated in FIG. 17, the spouse searching system includes the emotion server 3, an evaluation server 7, and a spouse searching system server 8.

In the past, it was considerably difficult to determine personality of a person before actual meeting in a marriage agency, a business interview, or the like. In particular, a private detective agency was also used to inquire the past life of a marriage partner. Accordingly, in the system, emotion values obtained by digitizing the personality of an evaluatee (a user X) specified in positive interactions, such as the number of times other persons say "thank you" to the evaluatee (the user X) until now or the number of times the evaluatee receive smiles around the evaluatee, are calculated to be used in the spouse searching system. Thus, it is possible to objectively determine whether third parties feel that the evaluatee is a good person. In particularly, if the personality can be provided as a searching condition for match in a marriage agency, convenience of the marriage agency is considerably improved.

Specifically, as illustrated in FIG. 17, interactions between the evaluatee and other people are detected on a daily basis and accumulated in the emotion server 3. In addition, the emotion server 3 transmits an emotion value based on a positive interaction evaluation value of a specific user to the evaluation server 7 as necessary.

The evaluation server 7 acquires the emotion value based on the positive interaction evaluation value of the specific user from the emotion server 3 on the basis of the object ID of the specific user, for example, in a response to a request from the spouse searching system server 8, evaluates the person, and replies to the spouse searching system server 8 with an evaluation result (for example, a radar chart indicating the evaluation).

The spouse searching system server 8 designates an object ID of a registered member and requests evaluation of a positive interaction emotion value of the member from the evaluation server 7. The spouse searching system server 8 opens the evaluation of the member to a service user, a user Y, so that the evaluation of the member can be used for match of a marriage partner (see FIG. 1). The evaluation may be indicated by points for each kind of positive interaction (for example, "receiving a smile," "smiling," "hearing thank you," "saying thank you", and the like) or may be indicated by a radar chart illustrated in FIG. 1. In addition, the spouse searching system server 8 can also feed the acquired evaluation back to the personal member (the evaluatee: the user X) to prompt the member to consciously change behavior and make an effort to give a favorable impression. At this time, the evaluation of the member may be displayed with numerical values on the month-to-month basis, for example.

The overview of the configuration of the system according to the embodiment has been described above. Also, in the example illustrated in FIG. 17, the emotion server 3 and the evaluation server 7 are illustrated as separate servers, but the embodiment is not limited thereto. The emotion server 3 and the evaluation server 7 may be an integrated server.

(3-3-2. Configuration of Evaluation Server)

Figure 18:
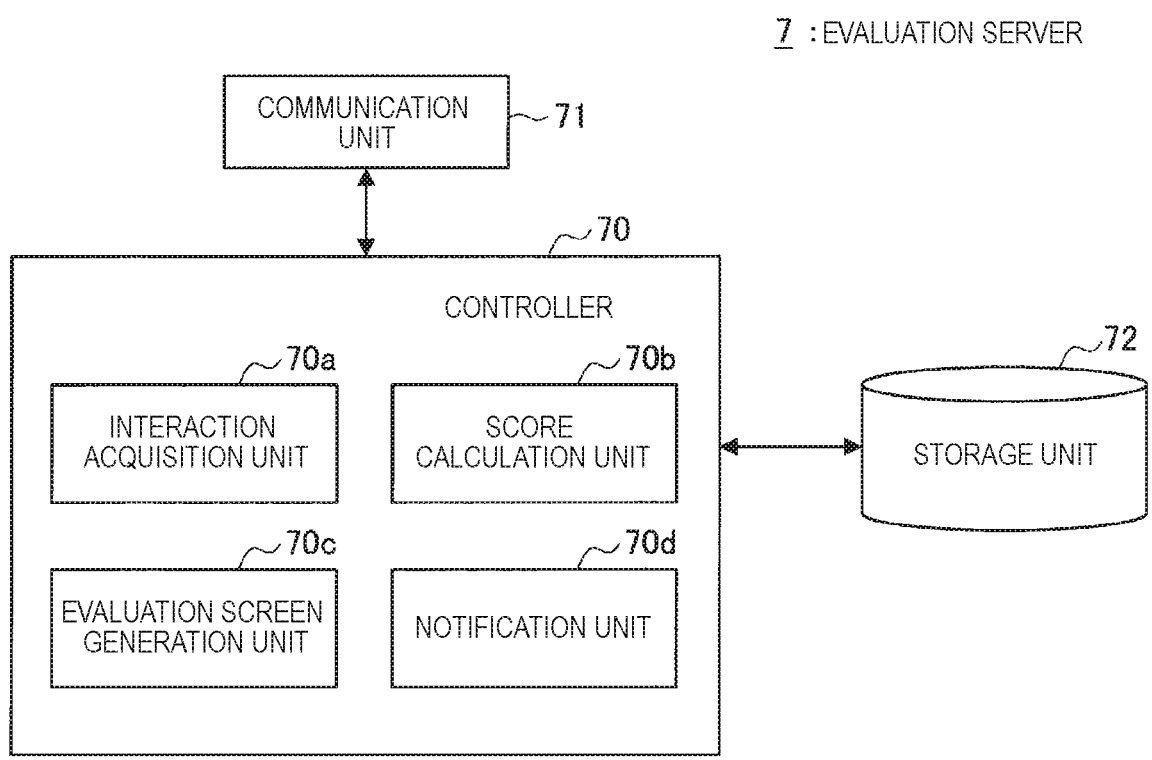
FIG. 18 is a diagram illustrating an example of the configuration of an evaluation server according to the third embodiment.

Next, the configuration of the evaluation server 7 included in the system will be described with reference to FIG. 18. FIG. 18 is a diagram illustrating an example of the configuration of an evaluation server 7 according to the third embodiment. As illustrated in FIG. 18, the evaluation server 7 includes a controller 70, a communication unit 71, and a storage unit 72.

(Controller)

The controller 70 is configured with a microcomputer that includes a CPU, a ROM, a RAM, and a nonvolatile memory and controls each configuration of the evaluation server 7. In addition, as illustrated in FIG. 18, the controller 70 functions as an interaction acquisition unit 70a, a score calculation unit 70b, an evaluation screen generation unit 70c, and a notification unit 70d.

The interaction acquisition unit 70a has a function of acquiring an emotion value of a positive interaction of a specific user from the emotion server 3 via the communication unit 71. More specifically, the interaction acquisition unit 70a acquires an emotion value based on a positive interaction from the emotion server 3 on the basis of an object ID designated by the spouse searching system server 8.

The score calculation unit 70b calculates an evaluation score on the basis of the emotion value of the positive interaction acquired by the interaction acquisition unit 70a. The evaluation score may be the number of times of each kind of positive interaction, may be an average value, or may be a point obtained by multiplying the number of times or the average value by a weighting coefficient in accordance with the kind of positive interaction.

The evaluation screen generation unit 70c generates an evaluation screen indicating an evaluation score of a target person on the basis of the score calculated by the score calculation unit 70b. A specific example of the evaluation screen will be described below with reference to FIGS. 20 to 22. For example, the evaluation screen generation unit 70c generates a graph such as a radar chart based on the score calculated by the score calculation unit 70b as an evaluation screen.

The notification unit 70d performs control such that the spouse searching system server 8 of a request source is notified of the evaluation screen generated by the evaluation screen generation unit 70c.

(Communication Unit)

The communication unit 71 receives an emotion value of a positive interaction from the emotion server 3 via the network 5. In addition, the communication unit 71 transmits the generated evaluation screen to the spouse searching system server 8 under the control of the notification unit 70d.

(Storage Unit)

The storage unit 72 stores a program used for the controller 70 to perform each process or parameters necessary to perform each process. In addition, the storage unit 72 may temporarily store the calculated evaluation score or the generated evaluation screen.

The configuration of the evaluation server 7 according to the embodiment has been described above. Also, the notification unit 70d in the control unit 70 of the evaluation server 7 may transmit the evaluation score calculated by the score calculation unit 70b to the spouse searching system server 8 in response to a request from the spouse searching system server 8. In this case, in the spouse searching system server 8, generation of an evaluation screen such as generation of a radar chart based on the evaluation score can be performed (that is, the function of the evaluation screen generation unit 70c is included in the spouse searching system server 8).

(3-3-3. Operation Process)

Figure 19:
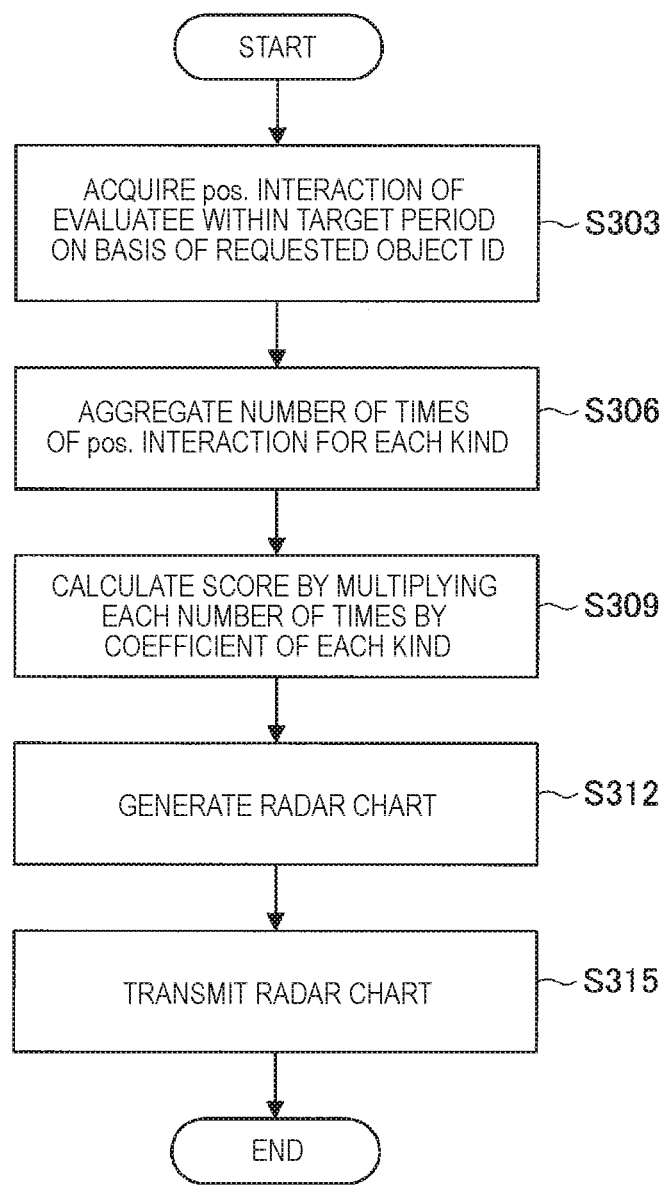
FIG. 19 is a flowchart illustrating an operation process of the spouse searching system according to the third embodiment.

Next, an operation process according to the embodiment will be described with reference to FIG. 19. FIG. 19 is a flowchart illustrating an operation process of the spouse searching system according to the embodiment.

As illustrated in FIG. 19, in step S303, the interaction acquisition unit 70a of the evaluation server 7 first acquires the emotion value of the positive interaction within a predetermined target period with the object ID designated by the spouse searching system server 8 from the emotion server 3.

Subsequently, in step S306, the score calculation unit 70b of the evaluation server 7 aggregates the number of times of each kind of positive interaction on the basis of the positive interaction emotion value. Examples of the kind of positive interaction include "hearing/saying thank you," "receiving a smile/smiling," "fellowship," "having/receiving consultation," "giving/receiving a gift", and the like. The number of fellowship interactions (the number of fellowships such as get-together or parties) can be estimated on the basis of exchanges with friends in Social Network System (SNS) or an interaction such as captured images in which friends are shown together and which are posted in SNS. In addition, the number of consultation interactions may be counted on the basis of the number of replies of helpful interactions on problem discussion bulletin boards or the like on the Internet or the number. In addition, the number of gift interactions is not limited to the delivery interaction of physical gifts and may be counted on the basis of the number of times electronic goods or electronic points are awarded in games, SNS, shopping sites, or the like on networks or a pushed amount of buttons indicating kindness to partners.

Subsequently, in step S309, the score calculation unit 70b calculates an evaluation score of each kind of interaction on the basis of the aggregated number of time. For example, the score calculation unit 70b may calculate the evaluation score by multiplying the number of times by a coefficient (weight) of each kind of interaction.

Subsequently, in step S312, the evaluation screen generation unit 70c generates a graph such as a radar chart indicating the evaluation score of a target person as an evaluation screen on the basis of the evaluation score calculated by the score calculation unit 70b.

Then, in step S315, the notification unit 70d transmits the generated evaluation screen (for example, a radar chart) to the spouse searching system server 8.

The operation process according to the embodiment has been described specifically above. Thus, the side of the spouse searching system server 8 can generate a screen for members (for example, a screen including the evaluation screen and member profile information (a face image, a name, an age, and the like)) using the evaluation screen, and transmits the generated screen for members to a member terminal (for example, the information processing device 9). Here, an example of the member screen supplied from the spouse searching system server 8 will be described with reference to FIGS. 20 to 22.

Figure 20:
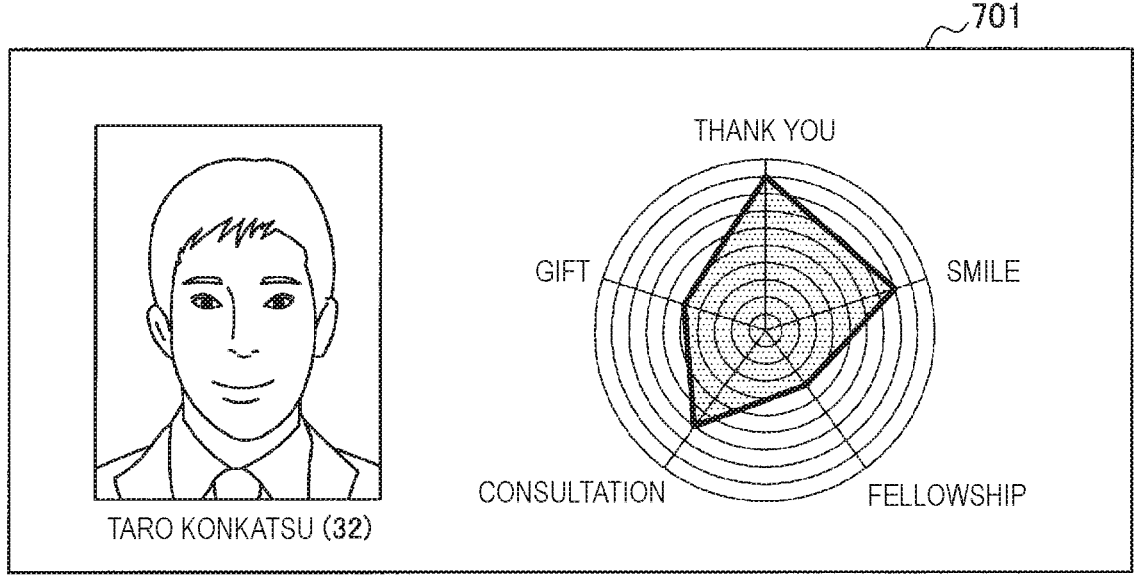
FIG. 20 is a diagram illustrating an example of a member screen according to the third embodiment.

FIG. 20 is a diagram illustrating an example of the member screen according to the embodiment. A display screen 701 illustrated in FIG. 20 is displayed on the information processing device 9 of a system user and is browsed by the user Y searching for a marriage partner. Along with profile information (a face image, a name, an age, and the like) of a member, evaluation scores of ordinary positive interactions (evaluation scores of "thank you," a "smile," "fellowship," "consultation," and a "gift") of the member are displayed with a radar chart on the display screen 701. The user Y viewing the radar chart illustrated in FIG. 20 can confirm the personality (character) of the person and determine whether a candidate is suitable for a marriage partner.

Figure 21:
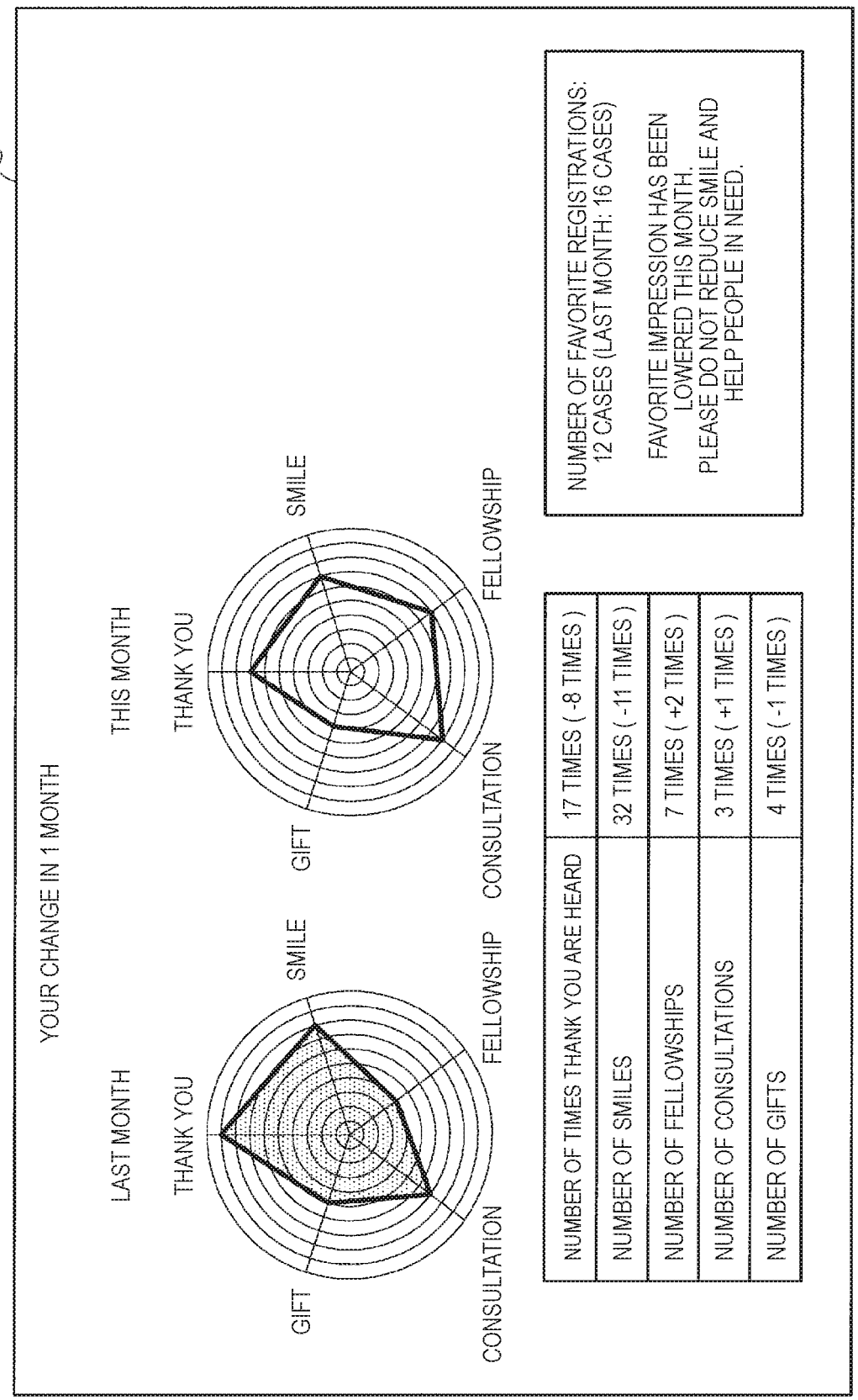
FIG. 21 is a diagram illustrating an example of a personal member screen according to the third embodiment.

FIG. 21 is a diagram illustrating an example of a personal member screen according to the embodiment. A display screen 702 illustrated in FIG. 21 is displayed on the information processing terminal of the personal member and can prompt the member to consciously change behavior and make an effort to give a favorable impression so that the personal member improves everyday behavior. Specifically, on the display screen 702, evaluation charts of this month and the last month are displayed and, in addition, a change in the evaluations scores (or the aggregated number of times) from the last month is indicated as a numerical value.

Further, an increase or decrease in "favorite registration" from the opposite sex in the spouse searching system is suggested and advice for raising the favorable impression of the personal member is displayed.

Figure 22:
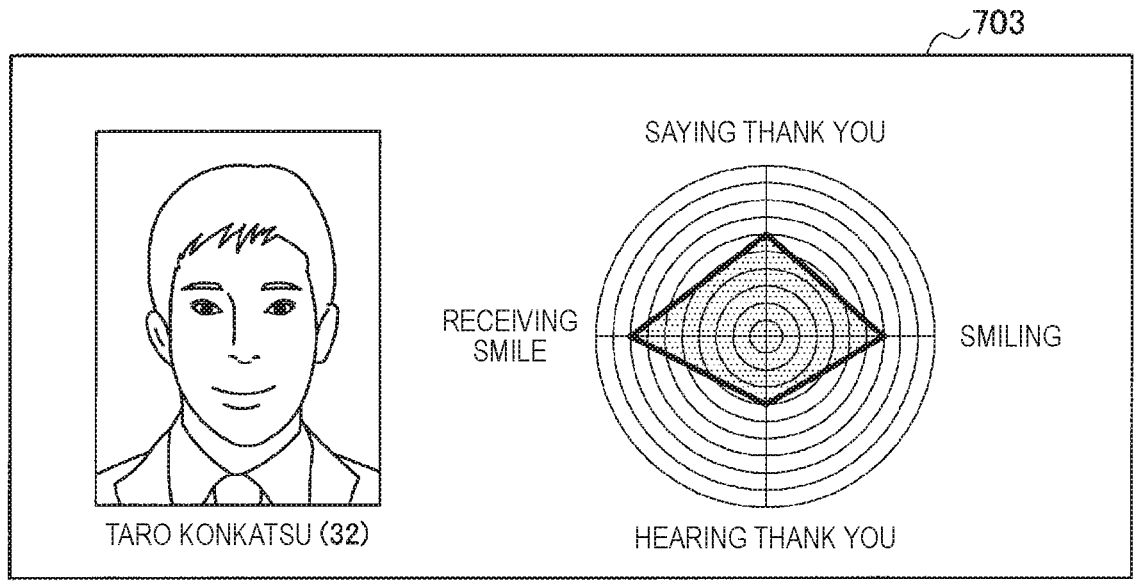
FIG. 22 is a diagram illustrating another example of the member screen according to the third embodiment.

FIG. 22 is a diagram illustrating another example of the member screen according to the embodiment. A display screen 703 illustrated in FIG. 22 is displayed on the information processing device 9 of a system user and is browsed by the user Y searching for a marriage partner. As illustrated in the display screen 703, a radar chart indicating evaluation scores may be a radar chart that has four quadrants mapped on active/passive axes such as the number of times of saying/hearing "thank you" and the number of times of smiling/receiving a smile.

<<4. Conclusion>>

As described above, the information processing system according to the embodiments of the present disclosure enables positive interactions between people and people or things to be generated as emotion values.

In addition, the emotion values of the positive interactions are opened to people other than people opening the emotion values or are allowed to be used for various services, so that smiles or words "thank you" are increased in daily life. Finally, happiness of the whole society can be increased.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program that exerts a function of the object 1 of a thing, the sensing device 2, the emotion server 3, the bias calculation server 4, or the evaluation server 7 can be created in hardware such as the CPU, the ROM, and the RAM contained in the object 1, the sensing device 2, the emotion server 3, the bias calculation server 4, or the evaluation server 7 described above. In addition, a computer-readable recording medium storing the computer program is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a communication unit configured to receive information related to a positive interaction presented to a second object by a first object and information related to a positive interaction presented to the first object by the second object; and a controller configured to generate an emotion value of the first object on the basis of at least a part of the received information related to the positive interactions.

(2)

The information processing system according to (1), in which the received information related to the positive interactions is associated with the first object and stored in a storage unit, and the communication unit transmits the emotion value of the first object generated on the basis of the information related to the positive interactions stored in the storage unit to a third object.

(3)

The information processing system according to (2), in which the communication unit transmits the information related to the positive interaction currently presented by the first object to the third object in real time.

(4)

The information processing system according to (2) or (3), in which the communication unit receives information related to an interaction of the third object and transmits the information to a fourth object which the first object is currently capable of viewing in real time and which is capable of presenting the information related to the interaction.

(5)

The information processing system according to (1), in which the received information related to the positive interactions is associated with the first object and stored in a storage unit, the controller generates the emotion value of the first object generated on the basis of information related to a positive interaction stored in the storage unit at a timing of fee revision for insurance to which a person who is the first object is subscribed or in response to a request from an insurance management server managing the insurance fee, and the communication unit transmits the emotion value to the insurance management server.

(6)

The information processing system according to (1), in which the received information related to the positive interactions is associated with the first object and stored in a storage unit, the controller generates the emotion value of the first object generated on the basis of information related to a negative interaction stored in the storage unit at a timing of fee revision for insurance to which a person who is the first object is subscribed or in response to a request from an insurance management server managing the insurance fee, and the communication unit transmits the emotion value to the insurance management server.

(7)

The information processing system according to (1), in which the received information related to the positive interactions is associated with the first object and stored in a storage unit, the controller generates an evaluation chart on the basis of information related to a positive interaction stored in the storage unit when an evaluation request for the first object is received from a predetermined information processing device via the communication unit, and the communication unit transmits the evaluation chart to the predetermined information processing device.

(8)

The information processing system according to (7), in which the evaluation chart is a graph.

(9)

A communication device including:

an imaging unit configured to image an expression of a second object facing a first object wearing the communication device;

a directional sound collection unit configured to collect a sound of the second object;

a communication unit configured to transmit identification information of the first object and receive identification information of the second object; and a controller configured to associate an image captured by the imaging unit or a sound collected by the directional sound collection unit with the identification information of the first object and the identification information of the second object, and perform transmission, via the communication unit, to a server including a storage unit that stores information related to an interaction of an object in association with identification information of the object.

(10)

A communication device including:

an imaging unit configured to image an expression of a first object wearing the communication device and an expression of a second object facing the first object;

a sound collection unit configured to collect a sound of the first object and a sound of the second object; and a controller configured to associate an image and a sound of a first object and an image and a sound of a second object acquired by the imaging unit and the sound collection unit with identification information of the first object, and perform transmission, via a communication unit, to a server including a storage unit that stores information related to an interaction of an object in association with identification information of the object.

(11)

A control method including:

receiving information related to a positive interaction presented to a second object by a first object and information related to a positive interaction presented to the first object by the second object; and generating, by a controller, an emotion value of the first object on the basis of at least a part of the received information related to the positive interactions.

(12)

A storage medium storing a program that causes a computer to function as:

an imaging unit configured to image an expression of a second object facing a first object wearing a communication device;

a directional sound collection unit configured to collect a sound of the second object;

a communication unit configured to transmit identification information of the first object and receive identification information of the second object; and a controller configured to associate an image captured by the imaging unit or a sound collected by the directional sound collection unit with the identification information of the first object and the identification information of the second object, and perform transmission, via the communication unit, to a server including a storage unit that stores information related to an interaction of an object in association with identification information of the object.

(13)

A storage medium storing a program that causes a computer to function as:

an imaging unit configured to image an expression of a first object wearing a communication device and an expression of a second object facing the first object;

a sound collection unit configured to collect a sound of the first object and a sound of the second object; and a controller configured to associate an image and a sound of a first object and an image and a sound of a second object acquired by the imaging unit and the sound collection unit with identification information of the first object, and perform transmission, via a communication unit, to a server including a storage unit that stores information related to an interaction of an object in association with identification information of the object.

REFERENCE SIGNS LIST 1, 1A to 1F object
2 sensing device
21 sensor
22 interaction extraction unit
23 communication unit
3 emotion server
30 controller
30a interaction storage controller
30b evaluation unit
30c object management nit
30d related object search unit
30e emotion value calculation unit
31 communication unit
32 object DB
33 emotion information DB
4 bias calculation server
40 controller
40a emotion value acquisition unit
40b bias calculation unit
40c notification unit
41 communication unit
42 storage unit
5 network
6 insurance system server
7 evaluation server
70 controller
70a interaction acquisition unit
70b score calculation unit
70c evaluation screen generation unit
70d notification unit
71 communication unit
72 storage unit
8 spouse searching system server
9 information processing device

The invention claimed is:

1. A communication system, comprising:
a first communication device, comprising:
a camera configured to capture an image of an expression of a second object facing a first object on which the first communication device is mounted;
a microphone configured to collect a sound of the second object; and
a processor configured to:
control transmission of first identification information of the first object and reception of second identification information of the second object;
associate at least one of the image captured by the camera or the sound collected by the microphone with the first identification information of the first object and the second identification information of the second object; and
control transmission of the at least one of the image or the sound along with the first identification information and the second identification information to a server, wherein the at least one of the image or the sound is transmitted for generation of a plurality of emotion values of the second object based on the second identification information, and generation of a bias value based on an average value of the plurality of emotion values; and a second communication device configured to:
receive a first instruction to control a first movement of a third object in case the bias value is less than a threshold;
receive a second instruction to control a second movement of the third object in case the bias value is greater than the threshold, wherein the second movement is different from the first movement; and
control transmission of specific information related to a real time positive interaction of the third object to a fourth object, wherein
the specific information is transmitted based on the control of one of the first movement or the second movement of the third object,
the fourth object is controllable based on an emotion value of the real time positive interaction of the third object,
the emotion value of the real time positive interaction of the third object is based on the specific information, and
the second object views the fourth object in real time.

2. The communication system according to claim 1, wherein the captured image and the collected sound are stored in a database.

3. The communication system according to claim 1, wherein the processor is further configured to control transmission of the captured image and the collected sound which are related to positive interactions between the first object and the second object in real time.

4. The communication system according to claim 1, wherein
the captured image and the collected sound, related to positive interactions between the first object and the second object, are stored in a database, and
the processor is further configured to:
generate the plurality of emotion values of the second object, based on the captured image and the collected sound stored in the database, one of at a timing of fee revision for insurance to which the second object is subscribed or in response to a request from an insurance management server that manages an insurance fee; and
control transmission of the plurality of emotion values to the insurance management server.

5. The communication system according to claim 1, wherein
the processor is further configured to:
generate the plurality of emotion values of the second object, related to negative interactions stored in the database, one of at a timing of fee revision for insurance to which the second object is subscribed or in response to a request from an insurance management server that manages an insurance fee; and
control transmission of the plurality of emotion values to the insurance management server.

6. The communication system according to claim 1, wherein
the captured image and the collected sound, related to positive interactions between the first object and the second object, are stored in a database, and
the processor is further configured to:
receive an evaluation request for the second object from an information processing device;
generate an evaluation chart based on the captured image and the collected sound related to positive interactions stored in the database and the received evaluation request for the second object; and
control transmission of the evaluation chart to the information processing device.

7. The communication system according to claim 6, wherein the evaluation chart is a graph.

8. A communication system, comprising:
a first communication device, comprising:
a camera configured to image an expression of a first object on which the first communication device is mounted, and an expression of a second object facing the first object;
a microphone configured to collect a sound of the first object and a sound of the second object; and
a processor configured to:
associate an image and the sound of the first object and an image and the sound of the second object with identification information of the first object; and
control transmission of the image and the sound of the first object and the image and the sound of the second object along with the identification information to a server, wherein the image and the sound of the first object is transmitted for generation of a plurality of emotion values of the first object based on the identification information, and generation of a bias value based on an average value of the plurality of emotion values; and
a second communication device configured to:
receive a first instruction to control a first movement of a third object in case the bias value is less than a threshold;
receive a second instruction to control a second movement of the third object in case the bias value is greater than the threshold, wherein the second movement is different from the first movement; and
control transmission of specific information related to a real time positive interaction of the third object to a fourth object, wherein
the specific information is transmitted based on the control of one of the first movement or the second movement of the third object,
the fourth object is controllable based on an emotion value of the real time positive interaction of the third object,
the emotion value of the real time positive interaction of the third object is based on the specific information, and
the first object views the fourth object in real time.

9. A non-transitory computer-readable medium storing computer-executable instructions, which when executed by a processor, cause the processor to execute operations, the operations comprising:
in a first communication device:
capturing, by a camera, an image of an expression of a second object facing a first object on which the first communication device is mounted;
collecting, by a microphone, a sound of the second object;
controlling transmission of first identification information of the first object and reception of second identification information of the second object;
associating at least one of the image captured by the camera or the sound collected by the microphone with the first identification information of the first object and the second identification information of the second object; and controlling transmission of the at least one of the image or the sound along with the first identification information and the second identification information to a server, wherein the at least one of the image or the sound is transmitted for generation of a plurality of emotion values of the second object based on the second identification information, and generation of a bias value based on an average value of the plurality of emotion values;

in a second communication device:

receiving a first instruction to control a first movement of a third object in case the bias value is less than a threshold;

receiving a second instruction to control a second movement of the third object in case the bias value is greater than the threshold, wherein the second movement is different from the first movement; and controlling transmission of specific information related to a real time positive interaction of the third object to a fourth object, wherein the specific information is transmitted based on the control of one of the first movement or the second movement of the third object, the fourth object is controllable based on an emotion value of the real time positive interaction of the third object, the emotion value of the real time positive interaction of the third object is based on the specific information, and the second object views the fourth object in real time.

10. A non-transitory computer-readable medium storing computer-executable instructions, which when executed by a processor, cause the processor to execute operations, the operations comprising:

in a first communication device:

capturing, by a camera, an expression of a first object on which the first communication device is mounted, and an expression of a second object facing the first object;

collecting, by a microphone, a sound of the first object and a sound of the second object;

associating an image and the sound of the first object and an image and the sound of the second object with identification information of the first object; and controlling transmission of the image and the sound of the first object and the image and the sound of the second object along with the identification information to a server, wherein the image and the sound of the first object is transmitted for generation of a plurality of emotion values of the first object based on the identification information, and generation of a bias value based on an average value of the plurality of emotion values;

in a second communication device:

receiving a first instruction to control a first movement of a third object in case the bias value is less than a threshold;

receiving a second instruction to control a second movement of the third object in case the bias value is greater than the threshold, wherein the second movement is different from the first movement; and controlling transmission of specific information related to a real time positive interaction of the third object to a fourth object, wherein the specific information is transmitted based on the control of one of the first movement or the second movement of the third object, the fourth object is controllable based on an emotion value of the real time positive interaction of the third object, the emotion value of the real time positive interaction of the third object is based on the specific information, and the first object views the fourth object in real time.

* * * * *